(12) United States Patent
Yu et al.

(10) Patent No.: US 10,175,662 B2
(45) Date of Patent: Jan. 8, 2019

(54) METHOD OF CONSTRUCTING NAVIGATION MAP BY ROBOT USING MOUSE HIPPOCAMPAL PLACE CELL MODEL

(71) Applicant: Beijing University of Technology, Beijing (CN)

(72) Inventors: Naigong Yu, Beijing (CN); Yunhe Yuan, Beijing (CN); Xiaojun Jiang, Beijing (CN); Ti Li, Beijing (CN); Lue Fang, Beijing (CN); Ziwei Luo, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 15/783,908

(22) Filed: Oct. 13, 2017

(65) Prior Publication Data
US 2018/0046153 A1    Feb. 15, 2018

Related U.S. Application Data

(63) Continuation of application No. PCT/CN2017/078074, filed on Mar. 24, 2017.

(30) Foreign Application Priority Data

Jul. 10, 2016    (CN) .......................... 2016 1 0540175

(51) Int. Cl.
*B25J 9/16* (2006.01)
*G05B 13/04* (2006.01)
(Continued)

(52) U.S. Cl.
CPC ............ *G05B 13/04* (2013.01); *B25J 9/1671* (2013.01); *G05B 13/027* (2013.01); *G05D 1/02* (2013.01); *G05D 1/027* (2013.01); *G05D 1/0231* (2013.01)

(58) Field of Classification Search
CPC .. G05B 13/04; G05B 13/027; G05B 13/0285; G05B 13/029; B25J 9/1671;
(Continued)

(56) References Cited

U.S. PATENT DOCUMENTS

| 2006/0129506 A1* | 6/2006 | Edelman | ............... | G05D 1/0088 706/12 |
| 2007/0094481 A1* | 4/2007 | Snook | .................... | G06N 3/063 712/200 |
| 2007/0100780 A1* | 5/2007 | Fleischer | ............. | G05B 13/027 706/15 |

FOREIGN PATENT DOCUMENTS

| CN | 103699125 A | 4/2014 |
| CN | 103778332 A | 5/2014 |
| CN | 106125730 A | 11/2016 |

OTHER PUBLICATIONS

Correa; "Mobile Robots Navigation in Indoor Environments Using Kinect Sensor"; Critical Embedded Systems (CBSEC), 2012 Second Brazilian Conference on; pp. 36-41, May 20-25, 2012 (Year: 2012).*

(Continued)

*Primary Examiner* — Stephen Holwerda
(74) *Attorney, Agent, or Firm* — Zhihua Han; Le Tian

(57) ABSTRACT

A robot constructs a navigation map based on the cognitive mechanism of rat hippocampus. The robot collects current self-motion cues and color depth map information through exploring the environment; self-motion cues form spatial environment codes gradually through path integral and feature extraction of spatial cells in hippocampus, place field of place cells is gradually formed during exploring the process and covers the whole environment to form a cognitive map. Further, Kinect collects scene view and color depth map information of the current position in right ahead direction as an absolute reference, proceeding path closed- (Continued)

loop detection to correct the errors of the path integral. At a close-loop point, the system proceeds reset of spatial cells discharging activity to correct the errors of the path integral. The final point in navigation map includes coding information of place cells series, corresponding visual cues and position topological relationship.

1 Claim, 18 Drawing Sheets

(51) Int. Cl.
*G06N 3/04* (2006.01)
*G05D 1/02* (2006.01)
*G05B 13/02* (2006.01)

(58) Field of Classification Search
CPC .......... B25J 9/1602; B25J 9/161; B25J 9/163; G05D 1/027; G05D 1/0231; G05D 1/0088; G06N 3/02; G06N 3/0454; G06N 3/049; G06N 3/06; G06N 3/063; G06N 7/046

See application file for complete search history.

(56) References Cited

OTHER PUBLICATIONS

Emter; "Simultaneous Localization and Mapping with the Kinect sensor"; Robotics, Proceedings of ROBOTIK 2012; 7th German Conference on, pp. 239-244, May 21-22, 2012 (Year: 2012).*

Kamarudin; "Method to convert Kinect's 3D depth data to a 2D map for indoor SLAM"; Signal Processing and its Applications (CSPA), 2013 IEEE 9th International Colloquium on, pp. 247-251, Mar. 8-10, 2013 (Year: 2013).*

Ghani; "Improvement of the 2D SLAM system using Kinect sensor for indoor mapping"; Soft Computing and Intelligent Systems (SCIS) 2014 Joint 7th International Conference on and Advanced Intelligent Systems (ISIS) 15th International Symposium on, pp. 776-781, 2014 (Year: 2014).*

Nengjian Tai, method to realize path integration based on multi-scale grid cells, Journal of Beijing University of Aeronautics and Astronautics, Jun. 30, 2013, 6(2013), p. 756-760.

MJ Milford, RatSLAM: A Hippocampus Model for Simultaneous Localization and Mapping «Proceedings of the 2004 IEEE International Conference on Robotics and Automation» Jan. 5, 2004, book 1, p. 403-408.

* cited by examiner

METHOD OF CONSTRUCTING NAVIGATION MAP BY ROBOT USING MOUSE HIPPOCAMPAL PLACE CELL MODEL

CROSS-REFERENCE TO RELATED APPLICATION

This application is a continuation application of International application number PCT/CN2017/078074, filed Mar. 24, 2017 titled "A Method of Constructing Navigation Map by Robot using Mouse Hippocampal Place Cell Model," which claims the priority benefit of Chinese Patent Application No. 201610540175.0, filed on Jul. 10, 2016, which is hereby incorporated by reference in its entirety.

TECHNICAL FIELD

The present disclosure involves a navigation map building algorithm based on the cognitive mechanism of rat hippocampus. Based on the navigation character of spatial cell in the hippocampal structure of the mammal, the robot moves automatically, and navigation map is built automatically. It is used for robot navigation map building under multiscale and complex environments.

BACKGROUND

Most currently used navigation map building algorithm is SLAM algorithm, such as grid map algorithm and topological map algorithm, the environmental feature point is collected by the wide-angle lens to build navigation map, it demands high quality for visual signals, image processing algorithms, and hardware performance. However, grid division and topological point collection are mainly finished by man-made setting, it only suitable for the specific static environment and hard to an extension. With the continuous complex of current motion environment, especially in dynamic condition, single navigation method is not satisfied with actual requirements, multi-navigation strategy will complement advantages of kinds of navigation methods to get better effect, the usually used data fusion mode is Kalman filtering algorithm, however, Kalman filtering algorithm needs to build motion model and observation model of system precisely, complex motion environment modeling is very complex in calculation, it restricts the application of Kalman filtering.

According to the mechanism of the biocognitive environment to make robot build environment cognitive map more intelligent, many drawbacks of currently used environment map building algorithm can be solved. Mammals (such as rat and human) need to encode for the environment when they move in it purposefully; it needs inner fusion for various sensor information, the inner neural expression is formed, this inner neural expression called cognitive map. Spatial navigation cell relates to environment cognition, and cognitive map building in the hippocampal structure are head direction cell, stripe cell, grid cell, border cell and spatial cell.

Hippocampus is the key encephalic region for animal environment cognition. In 1971, O'Keefe and Dostrovsky found that pyramidal neurons of region CA1 and CA2 in hippocampus only discharge in specific spatial position, when an animal is in a specific position, pyramidal neurons has the highest discharge frequency, when it goes away from this position, discharge frequency is decreased, these neurons is called place cell, animal activity range in environment relates to its discharge activity is called place field. Reflection relationship between brain and external environment is formed since selective discharge of place cell; it is a key factor for animal self-orientation and spatial environment cognition. More precisely, place cell has following properties:

Place field of place cell is generated swiftly when animal turns into a new environment; it will cover the whole environment through the traversal of environment;

Same position cell may issue in different environment and has different place field;

Different with neurocyte on visual cortex, specific position of place cell in brain has no relationship with its corresponding place field, in another word, place field of specific geographic position corresponding to two adjacent place cells may be not adjacent;

Exogenous information (such as visual, smell) and endogenous information (such as vestibule and body) can lead place cell to issue, and static place field is formed, place cell can also issue and form static place field without exogenous information (such as dark environment).

In 1990, Taube found a kind of head direction orientation neuron in back subicular, when animal's head heads to a specific direction, this kind of neuron has maximum discharge, it is called head direction cell, it is a kind of dependent head direction neuron, its discharge activity only relates to head direction in horizontal plane, it has no relation to the position, posture and actions if animal. Each head direction cell has only one optimum direction, in a fixed environment, head direction cell can contain steady state in a long time. It can be expressed as a gauss model.

In 2005, Hafting found grid cell which discharges strongly to specific spatial position through changing the shape and size of test chamber, when rat moves in two-dimensional space, regularly repeatable discharge of grid cell occurs in specific position, this spatial range is called grid field, triangle evoked set which is formed by connecting multiple grid cells discharge region, it covers whole spatial environment that the rat has passed. Spacing between two grid nodes is about 39-78 cm, spacing of grid firing field on dorsoventral side-axis along the entorhinal cortex is increasing gradually, usually, evoked set of same grid cell in different environment is different, when the rat is in dark environment, grid set is steady; there are 4 basic feature of grid formed by grid cell: ① spacing: distance between the centers of firing fields; ② orientation: angularity versus external reference coordinate; ③ phase: displacement in x-axis and y-axis versus external reference point; ④ size of firing field: spatial range of grid cell discharging. These 4 elements are a spatial parameter of grid map.

In 2012, O'Keefe proved that there exist periodical stripe firing field in parasubicular cortex and entorhinal cortex, it is called stripe cells, its' firing field covers the whole spatial environment in a parallel stripe shape. Stripe cells is considered as basic mechanism to finish path integral, its' firing activity can be characterized by four characters: ① stripe spacing: central distance between two stripe firing field; ② stripe field width: spatial horizontal discharge range of firing field; ③ stripe phase: displacement verse external reference point; ④ preferred direction: angularity of stripe field verse external reference coordinate system;

Activation rate of these five kinds of the spatial cell is shown in FIG. 2.

Head direction cell is located in presubiculum to encode head direction information, it projects on stripe cell in shallow cortex of entorhinal cortex, stripe cells in entorhinal cortex is worked as the input of grid cells to encode linear velocity information, grid cells proceeds path integral for inputting information of stripe cells, specific position codes and place field of place cells are formed through feature extraction. Place field is the key factors to build the cognitive map. Hippocampus has been considered as cognitive map structure of brain spatial environment representation, its' place cells, grid cells, and border cells in the entorhinal cortex, head direction cells in multiple encephalic regions, newly discovered stripe cells and various kinds of the sensory system which are formed the spatial navigation system inner brain.

Grid cells discharging and path integral of inner-source information is simulated by continuous attractor model, activity of spatial cells is derived from collective behavior of attractor neural network, the final state of network activity is: continuous steady state in low-dimensional flow pattern, these final steady state is attractor, position adjustment and update in flow pattern plate is derived from response of velocity of rat motion.

The present disclosure builds robot navigation map through combining hippocampus spatial cells of rat brain and color depth map collected by Kinect, attractor model is used as calculation model of spatial cells. Comparing with traditional SLAM navigation method, it requires low performance of hardware and sensor, it has better expandability and adaptability, the data fusion processing method used in the present disclosure is cost-effective compared with traditional Kalman filtering method, it builds a cognitive map of indoor and outdoor environment effectively and precisely.

SUMMARY

The present According to anatomical structures of the animal hippocampus and neurophysiological characteristics of spatial navigation cells, the present disclosure discloses an environment navigation map building method based on spatial cells action mechanism. Based on information transfer loop of spatial navigation cell in mammal hippocampus, as is shown in FIG. 3, robot collects current self-motion cues and color depth map information through exploring the environment, self-motion cues form spatial environment codes gradually through path integral and feature extraction of spatial cells in hippocampus, place field of place cells is gradually formed during exploring process and covers the whole environment to form a cognitive map. While at the same time, Kinect collects scene view and color depth map information of the current position in right ahead direction as an absolute reference, proceeding path closed-loop detection to correct the errors of the path integral. At a close-loop point, the system proceeds reset of spatial cells discharging activity to correct the errors of the path integral. The final point in navigation map including coding information of place cells series, corresponding visual cues and position topological relationship, a schematic diagram is shown in FIG. 1.

The present disclosure uses following technical scheme to reach the requirements mentioned above:

A navigation map building algorithm based on the cognitive mechanism of rat hippocampus, hardware schematic diagram is shown in FIG. 4.

The main part of data input of the algorithm is self-motion cues and visual information of image; it is realized by photoelectric encoder, gyroscope, and RGB-D sensor; photoelectric encoder collect velocity signals, gyroscope collects angle signals, RGB-D sensor collects color and depth images; CPU is used for calculating and managing the algorithm created by cognitive map, electrical control signal is created through electrical machinery to control the movement of robot.

Robot navigation map building algorithm based on hippocampus spatial cells, the whole process of the algorithm is shown below.

Step (1): at the beginning, set the head direction of the static robot as 0, collecting its transient velocity and angle information through its self-contained photoelectric encoder and gyroscope, while at the same time Kinetic collects image with the velocity of 2 FPS.

Step (2): linear velocity integral based on stripe cells;

Schematic diagram of single-dimensional stripe cells cyclic attractor model is shown in FIG. 5 (a). Robot collects its motion linear velocity and angle information through its self-contained photoelectric encoder and gyroscope, a moment of "t," the velocity in φ direction φ(t) is v(t) so that the velocity and displacement in $v_\theta(t)$ and $D_\theta(t)$ in a direction are:

$$v_\theta(t) = \cos(\theta - \varphi(t))v(t) \qquad (1)$$

$$D_\theta(t) = \int_0^t v_\theta(\tau)d\tau \qquad (2)$$

direction displacements are transformed into stripe cells to move in preferred direction θ, $x_{\theta\alpha}$ is discharging rate of stripe cells, it means in θ direction, the phase of stripe is α; discharging period of stripe cells is 1; stripe cells have the highest discharging rate at periodical position nl+α (n is integer) in preferred direction, thus, distance of stripe cells periodical discharge reset represents $\omega_{\theta\alpha}(t)$ is space phase difference between $D_\theta$ and α:

$$\omega_{\theta\alpha} = (d_\theta(t) - \alpha) \bmod l \qquad (3)$$

Discharging rate of stripe cells can be expressed as:

$$x_{\theta\alpha}(t) = e^{\left(-\frac{\left(\omega_{\theta\alpha}(t) - \frac{l}{2}\right)^2}{2\sigma_s^2}\right)} \qquad (4)$$

Standard deviation is expressed as $\sigma_s$, it describes the width of stripe cells in preferred direction.

Stripe cells across periodical position and its multiple positions are excited at the same time, displacement in space-specific direction is encoded as prior input information of grid cells and drive attractor of grid cells move on the flat surface.

Step (3): periodical position encoding of grid cells attractor model under two-dimensional continuous space.

There exists recursion connection between grid cells, interactions between weight values create grid cells attractors in space-specific position, the attractors is distributed in a hexagon; meanwhile, prior input from stripe cells drives attractor of grid cells to move on a flat surface to proceed periodical specific encoding for the whole surface; attractor surface is also called neural plate. Schematic diagram of two-dimensional grid cells cyclic attractor model is shown in FIG. 5 (b).

The kinetic formula of grid cells discharging rate is:

$$\tau \frac{ds_i}{dt} = f\left[\sum_j w_{ij}^g s_j + B_i\right] - s_i \qquad (5)$$

In the formula, τ represents corresponding time constant of neural, neural transferring function $f[\cdot]$ is a simple nonlinear rectification function, x>0, ƒ(x)=x, x≤0, ƒ(x)=0; neural discharging rate of neure i in current position is $s_i$, $w_{ij}^g$ represents connection weight value from neure i to neure j in neural plate, $\Sigma_j w_{ij}^g s_j$ represents inhibitive recursive input which is projected on neure i, $B_i$ represents prior excited input from stripe cells; each gird cell nerue i has a preferred direction $\theta_i$, this preferred direction information is determined by projection of stripe cells.

Grid cells receive a prior projection from stripe cells, preferred direction information in prior projection is used for ensuring the direction changing of output weight value, and ensuring velocity input information received by a robot.

$$B_i = \omega_{\theta\alpha}(t) \tag{6}$$

There exists recursion connection between grid cells, its recursion connection weight value is:

$$w_{ij}^g = w_0(\vec{x}_i - \vec{x}_j - \omega_{\theta\alpha}(t)) \tag{7}$$ and, $$w_0 = ae^{-\gamma|\vec{x}|^2} - e^{-\beta|\vec{x}|^2} \tag{8}$$

The shape of weight matrix likes a sombrero, high in the mid and low on both sides, its mid position is $\vec{x} - s_{\theta\alpha}(t)$, of all parameter setting, $\gamma = 1.05 \times \beta$, $\beta = 3/\lambda_{net}^2$, $\lambda_{net}$ is period of grid which is formed in nerual plate, which is determined by period 1 of stripe cells; a=1, all connection is inhibitory, partly inhibitive connection is enough to generate response of grid cells.

Step (4): coding generation in specific spatial position through the competitive neural network from grid cells to place cell.

Grid cells are input source of place cell, discharging of place cell is the output of path integral system; the distribution of weight value from grid cell series to position synapsis is studied to generate unimodal firing field of place cell series, determining the active proportion of grid cell with overlapping activity package in each position.

Using competitive Heb study algorithm to find the subset of grid cell series activities, calculating place cell series activities:

$$\frac{dw_{ij}^{eh}}{dt} = kp_i(s_j - \langle sj \rangle) \tag{9}$$

k represents study rate, $p_i$ is discharging rate of place cell, $s_j$ represents grid cell discharging rate, $\langle \cdot \rangle$ represents average discharging rate of grid cell, the right side of equation (9) determines change direction of weight: if current grid cell active rate is higher than average active rate which is input, synaptic connections is enhanced; otherwise, synaptic connections is inhibited; set $w_{ij}^{eh} \geq 0$ to ensure weight value is not a negative value, therefore, weight value through equation (9) is inhibited;

place cell space selectivity to a given place is derived from: to this given place, selective binding of activities of grid cell with many spatial phases and spatial spacing; therefore, grid cell with much spatial spacing and directions is needed, stripe cell with much spatial spacing and directions is also needed; each neural plate represents a grid cell series activity, the present disclosure generates many grid cell series with different size through average collecting a and $\lambda_{net}$; equation (9) detects grid cell series activity form spatial overlapping of multi-layer neural plate.

Place cell series activity is derived from projecting information of grid cell;

$$p_i(r) = A \cdot f[\Sigma_{j=1}^M w_{ij}^{eh} s_j(r) - C_{inh}] \tag{10}$$

A and $C_{inh}$ are gain constant and inhibitive constant of place cell network, M represents number of layers of grid cell neural plate, $w_{ij}^{eh}$ represents synaptic connection weight value from grid cell series "j" to place cell series "i", "r" represents current position of the animal; $C_{inh}$ is used to control the number of firing field of place cell, it is determined by B*max($p_i(r)$); it is ensured that there are few subsets of grid cell series is selected as single firing field of place cell through competitive algorithm mentioned above.

Step (5): iteration and update of place cell path integral

Measurement model at relative location of the actual external environment is built by place cell attractor model; its attractor model neural plate is shown in FIG. 5 (c). Two-dimensional continuous attractor model is on a neural plate through partial excitatory, partial inhibitive connection and overall inhibitive connection to form a random activity package; this attractor is driven by spatial cell path integral system;

Step (5-1) obtaining relative location of current points;

excitatory weight value connection matrix $\Sigma_{m,n}$ of place cell is built by a two dimensional Gaussian distribution, "m, n" represents the distance between abscissas of belonging units in coordinates X and Y; the distribution of weight value can be expressed as:

$$\varepsilon_{m,n} = e^{-(m^2+n^2)/k_p} \tag{11}$$

$k_p$ represents width constant of position distribution;

A variable quantity of place cell activity resulted from partial excitatory connection can be expressed as:

$$\Delta p_{EX,EY} = \Sigma_{i=0}^{(n_X-1)} \Sigma_{j=0}^{(n_Y-1)} p_{i,j} \varepsilon_{m,n} \tag{12}$$

$n_X$, $n_Y$ represents the scale of two dimensional matrix of place cell in (X,Y) space, it represents the activity range of attractor on neural plate; since place cell is borderless in network which is shown in FIG. 5(c). Place cell which located at the border of neural plate will connect with place cell at the border of another neural plate to generate excitatory connection; the precondition of place cell iteration and visual template matching is: finding relative position of place cell attractor in neural plate, coordinate of this relative position can be expressed by the subscript of weight value matrix:

$$m = (X-i)(\text{mod } n_X) \tag{13a}$$

$$n = (Y-j)(\text{mod } n_Y) \tag{13b}$$

Each place cell also receives overall inhibitive signal from the whole network; It is different from grid cell sombrero attractor model, inhibitive signal of place cell occurs after partial excitatory connection instead of working at the same time; symmetry between excitatory and inhibitive connection matrix guarantees suitable neural network kinetics, it ensures attractor in space cannot be excited without limitation; variable quantity of place cell activity resulted from inhibiting connection can be expressed as:

$$\Delta p_{IX,IY} = \Sigma_{i=0}^{n_X} \Sigma_{j=0}^{n_Y} p_{i,j} \psi_{m,n} - \varphi \tag{14}$$

$\psi_{m,n}$ represents weight value of inhibitive connection, level of overall inhibition is controlled by $\varphi$;

To ensure all place cell activity is no less than zero at the moment of "t+1", compare place cell activation rate with 0:

$$p_{X,Y}^{t+1} = \max\{p_{X,Y}^t + \Delta p_{EX,EY} + \Delta p_{IX,IY}, 0\} \tag{15}$$

then, proceed normalization for place cell activation rate:

$$p_{X,Y}^{t+1} = \frac{p_{X,Y}^t}{\sum_{i=0}^{n_X} \sum_{j=0}^{n_Y} p_{i,j}^t} \quad (16)$$

Step (5-2) place cell path integral

In the present disclosure, movement of place cell attractor is derived from path integral of spacing cell over self-motion cues, displacement in specific direction which drives grid cell attractor to move is encoded by stripe cell, grid attractor encodes two-dimensional space in specific direction to excite different grid cell series; movement of place attractor is determined by the subset of different grid cell series activity. Schematic diagram of this process is shown in FIG. 6.

Place cell discharging rate $p_{X,Y}^{t+1}$ after path integral can be expressed as:

$$p_{X,Y}^{t+1} = \sum_{m=\delta X_0}^{\delta X_0+1} \sum_{n=\delta Y_0}^{\delta Y_0+1} \alpha_{mn} p_{(m+X)(n+Y)}^t \quad (17)$$

$\delta X_0$, $\delta Y_0$ is rounded-down shift in X-Y the coordinate system, this shift value is determined by velocity and direction information:

$$\begin{bmatrix} \delta X_0 \\ \delta Y_0 \end{bmatrix} = \begin{bmatrix} \lfloor k_m \vec{e}_{\theta_i} v \cdot \cos\theta \rfloor \\ \lfloor k_n \vec{e}_{\theta_i} v \cdot \sin\theta \rfloor \end{bmatrix} \quad (18)$$

$\lfloor \cdot \rfloor$ represents rounded-down, $k_m$, $k_n$ are path integral constant, $\vec{e}_{\theta_i}$ is unit vector headed to $\theta_i$, $\theta$ represents current head direction, place cell activation rate in next moment is obtained by current place cell activation rate times residual value $\alpha_{mn}$, residual value is obtained by quantization of place cell activity package diffusion, this diffusion can be expressed by residual shift, it is derived from path integral of grid cell, path integral of grid cell is the derived from forward driving of stripe cell; so that residual shift is:

$$\begin{bmatrix} \delta X_f \\ \delta Y_f \end{bmatrix} = \begin{bmatrix} k_m \vec{e}_{\theta_i} v \cdot \cos\theta - \delta X_0 \\ k_n \vec{e}_{\theta_i} v \cdot \sin\theta - \delta Y_0 \end{bmatrix} \quad (19)$$

Residual value is the piecewise function of residual shift:

$$\alpha_{mn} = g(\delta X_f, m - \delta X_0) g(\delta Y_f, n - \delta Y_0) \quad (20)$$

$$g(p, q) = \begin{cases} 1-p, & q = 0 \\ p, & q = 1 \end{cases} \quad (21)$$

Step (5-3) matching of view template

Cognitive map generated by path integral has large error in wild area, it can not generate precise cognitive map, the present disclosure uses kinetic to collect RGB map and depth figure, proceeds closed-loop detection, when closed-loop is detected, RGB-D map as visual cues is used to correct the error of path integral and reset navigation cell series activity; when illumination changes, RGB map will be influenced, but depth map will not be influenced by illumination, closed-loop detection and new environment cognitive can be finished by comparing depth map and RGB map.

Visual template matching algorithm uses scan line intensity distribution of color and depth map; scan line intensity distribution is a one-dimensional vector, it is normalization of the sum of each line of the grey-scale map. Scanline intensity distribution map of an image is shown in FIG. 7; a represents the color map, b represents depth map. Scanline intensity distribution of figure which is collected by robot during detection process is stored as partial visual template, compare scan line intensity distribution of current figure with partial visual template which is stored before, if it matches successfully, so that we consider a closed-loop is found, it will be considered as a new visual template to store if it not matches.

Using average intensity absolute difference function to compare figure distribution and visual template; average intensity absolute difference between two scan line intensity distributions also called intensity shift, it is expressed as g(c):

$$g(c, I^j, I^k) = \frac{1}{b-|c|} \left( \sum_{i=1}^{b-|c|} |I_{i+max(c,0)}^j - I_{i-min(c,0)}^j| \right) \quad (22)$$

$I^j$, $I^k$ is scan line intensity distribution of figures which are compared, c is profile shift, b represents width of map;

Since map matching is highly influenced by illumination, lower the illumination influence to improve matching accuracy at different environment, color map and depth map matching are used simultaneously to ensure absolute position, since illumination intensity is different at different time in actual environment, different weight value is set to shift difference between color map and depth map, map fitness metric G can be obtained:

$$G = \mu_R |g_{iR}(c) - g(c)| + \mu_D |\mu g_{iD}(c) - g(c)| \quad (23)$$

$\mu_R$ and $\mu_D$ are weight value of color map and depth map, $\mu_R + \mu_D = 1$, in continuous map, the minimum shift value of $I^j$ and $I^k$ is $c_m$, it equals to the minimum G value of two maps;

$$c_m = \min_{c \in [\rho-b, b-\rho]}(G) \quad (24)$$

Shift ρ ensures there is an overlapping between two maps; set map compare threshold is $c_t$, when $c_m \leq c_t$, current map is a new map, it is stored in visual template set $\{V^i\}$, when $c_m \geq c_t$, it is considered as a repeating scene.

Step (6) construction and correction of cognitive map

Topological relationships between place cell discharging activities is established by cognitive map built in the present disclosure; it includes topological experimental point "e," topological relation between experimental points is expressed as $t_{ij}$; each experimental point includes: place cell discharging activity $p^i$ of current position, visual template $V^i$; position of single experimental point is expressed as $p^i$; so that single experimental point is defined as:

$$e_i = \{p^i, V^i, d^i\} \quad (25)$$

Step (6-1) empirical topological iteration

Set empirical threshold is $S_{th}$, a position metric D is obtained by comparing current position and position in experimental point:

$$D = |p^i - p| \quad (26)$$

When position metric of current experimental point is higher than empirical threshold or new visual template is found, a new experimental point is built;

transfer quantity $t_{ij}$ stores position change quantity which is calculated by path integral:

$$t_{ij} = \{\Delta d^{ij}\} \quad (27)$$

$t_{ij}$ forms a new connection relationship between current experimental point and former experimental point, $e_j = \{p^j, V^j, d^i + \Delta d^{ij}\}$, experimental point will not change during empirical iteration, it will only change when closed-loop is deceted;

Step (6-2) updating of empirical map in closed-loop position

When the actual closed-loop point is detected by the visual template, the robot returns to the same position, however, new experimental point generated by the accumulation of location variable in a closed-loop position not matches with this same position, to match them, all experimental point in the closed-loop position should be updated:

$$\Delta d^i = \theta[\Sigma_{j=1}^{N_f}(d^j - d^i - \Delta d^{ij}) + \Sigma_{k=1}^{N_t}(d^k - d^i - \Delta d^{ki})] \quad (28)$$

$\theta$ is a correcting rate constant, $N_f$ represents the transfer number from experimental point $e_i$ to another experimental point, $N_t$ represents the transfer number from another experimental point to experimental point $e_i$; in actual experiment, set $\theta = 0.5$, higher value will lead to unstable of the whole map, update process of the whole map is continuously, but it is the most significant in closed-loop position;

Step (6-3) spatial cell discharging reset

When the closed-loop point is detected by the robot through visual template matching, discharging rate of the spatial cell is reset to its previous active state.

DETAILED DESCRIPTION OF THE PREFERRED EMBODIMENTS

The present disclosure discloses a navigation map building algorithm based on cognitive mechanism of rat hippocampus, it uses a few sensors to build precise and universal robot navigation map through bionic ways, some problems of SLAM algorithm to sensor is solved, such as high requirements of hardware, high calculation complexity, limit precision and low adaptability. Next, the present disclosure will be described in more details accompanied with preferred embodiments.

Figure 8:
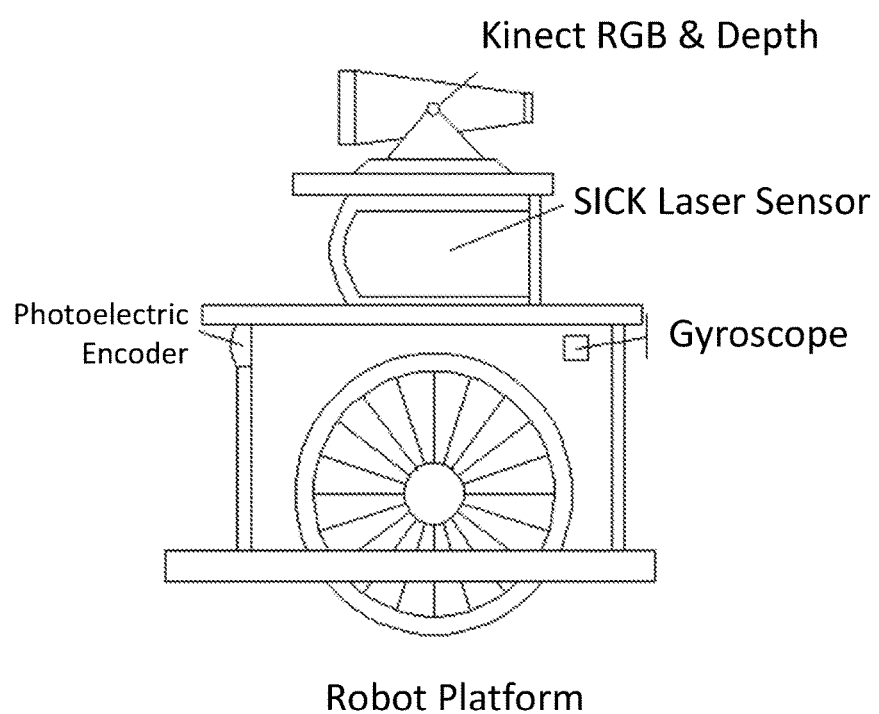
FIG. 8 is the robotic platform used in the present disclosure.

Robot in FIG. 8 is used to build a map for all embodiments. Moving device includes two front-wheel and one back-wheel, back-wheel is a small steering wheel, it is convenient for steady support and turning of the robot. Front-wheel equips photoelectric encoder to record and collect the robot moving velocity. Moving direction of the robot is collected by the built-in gyroscope.

Kinect is placed on the surface of the platform; it uses the inverter for electricity supply when the robot is moving, the RGB-D image is collected. Kinect connects PC directly and collects an RGB and a depth image with 2 FPS. The whole platform communicates with the robot through USB interface. Set the maximum velocity of moving robot platform is 0.5 m/s.

Figure 1:
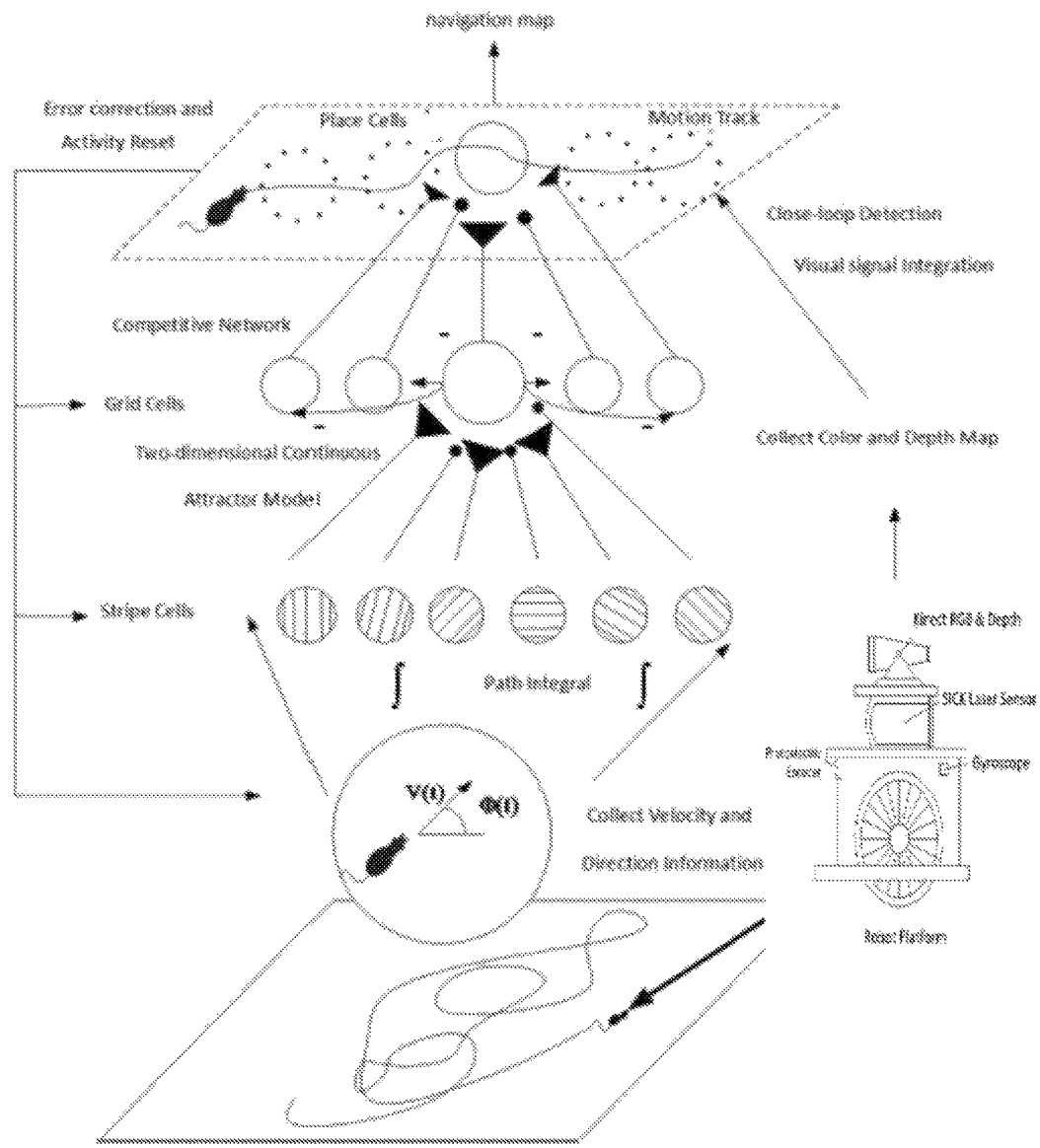
FIG. 1 is an algorithm and schematic diagram of the present disclosure.
Figure 2:
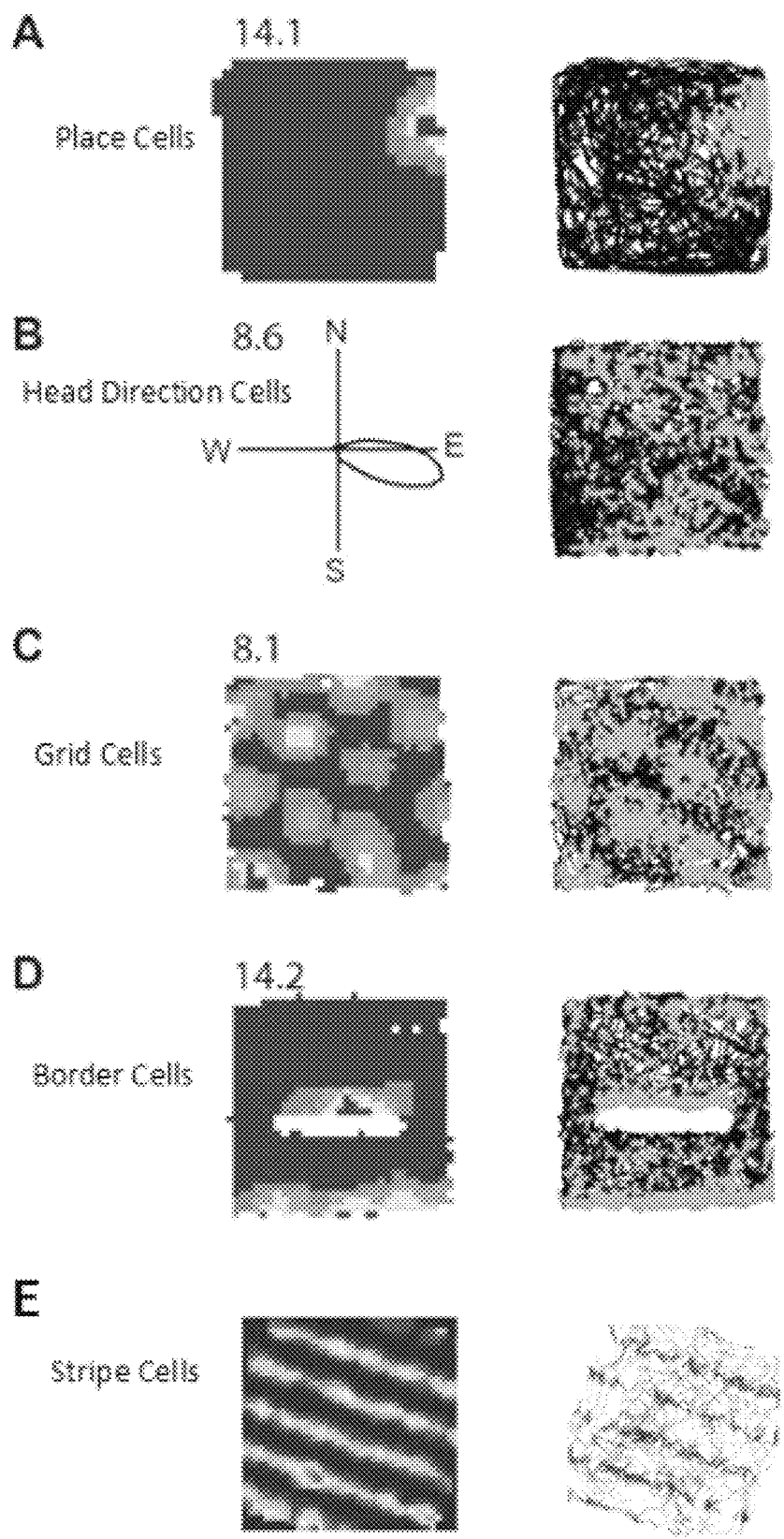
FIG. 2 is discharging rate of spatial cells involves in the present disclosure. Left diagram in A, C, D are discharging rate diagrams, the left diagram in B is polar coordinates of direction cells, this direction cell has the highest discharging rate in the southeast; Right diagrams are discharging rate diagrams of the locus.
Figure 3:
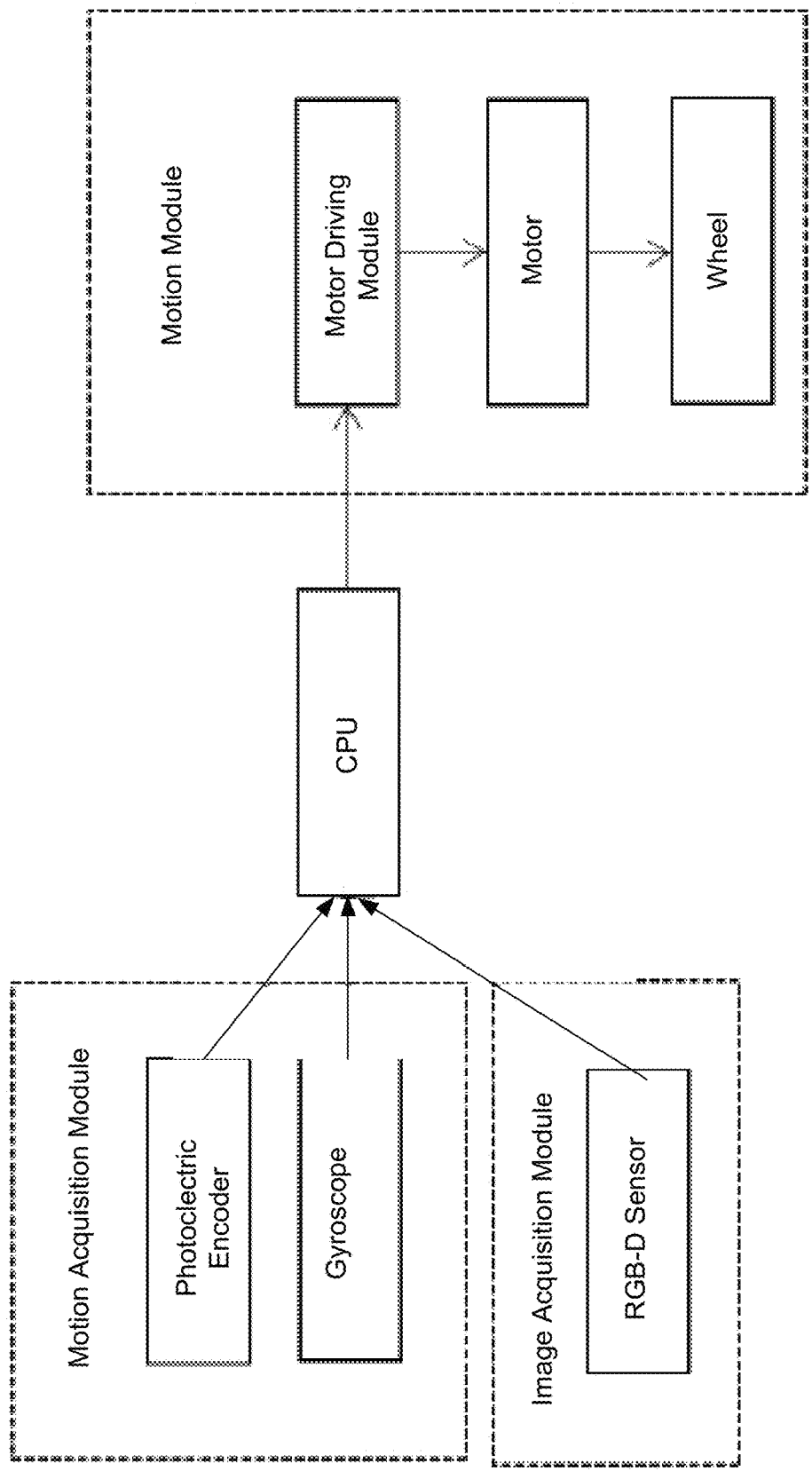
FIG. 3 is a schematic diagram of information transferring and models involves in the present disclosure.
Figure 4:
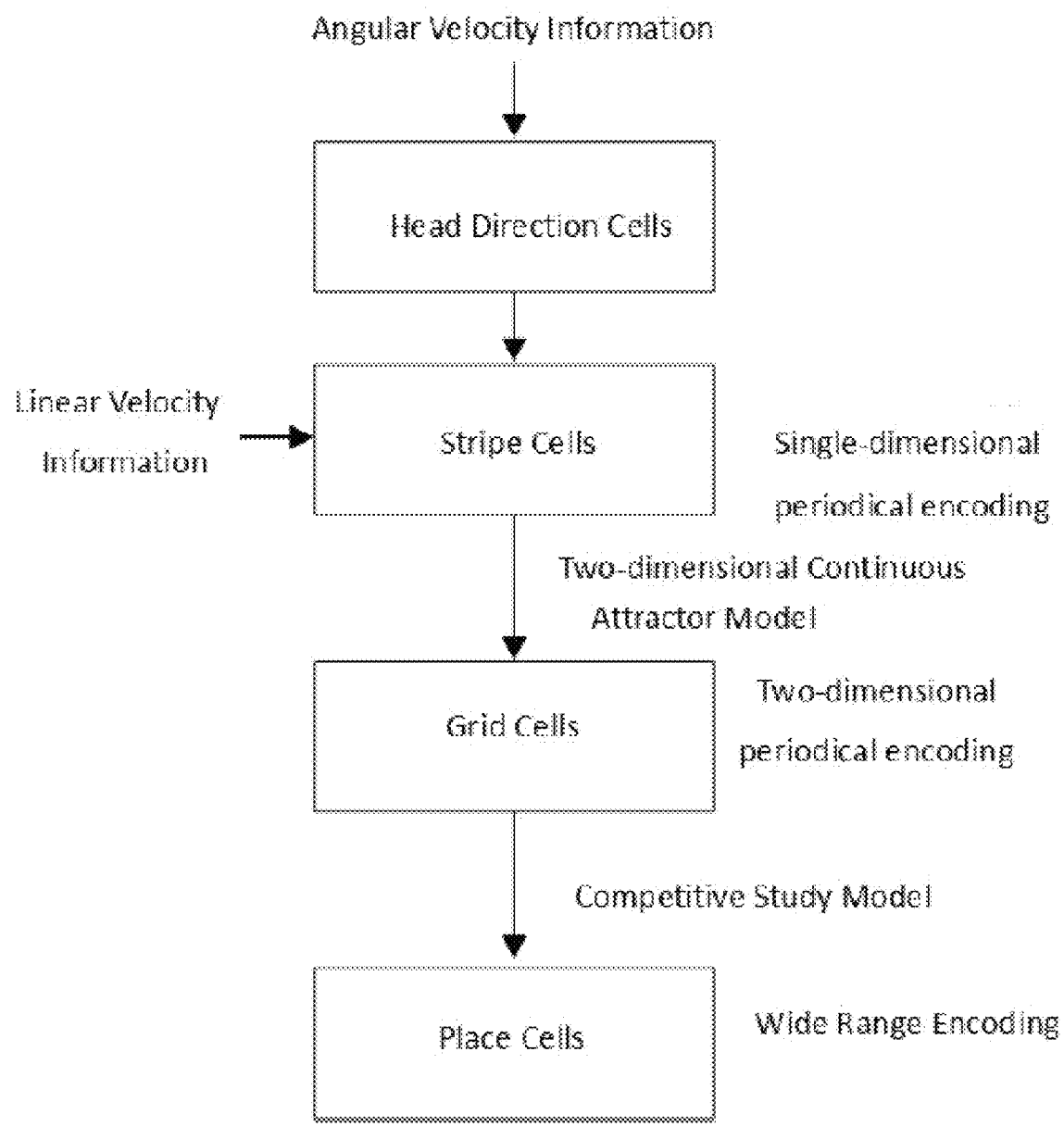
FIG. 4 is hardware structure in the present disclosure.
Figure 5:
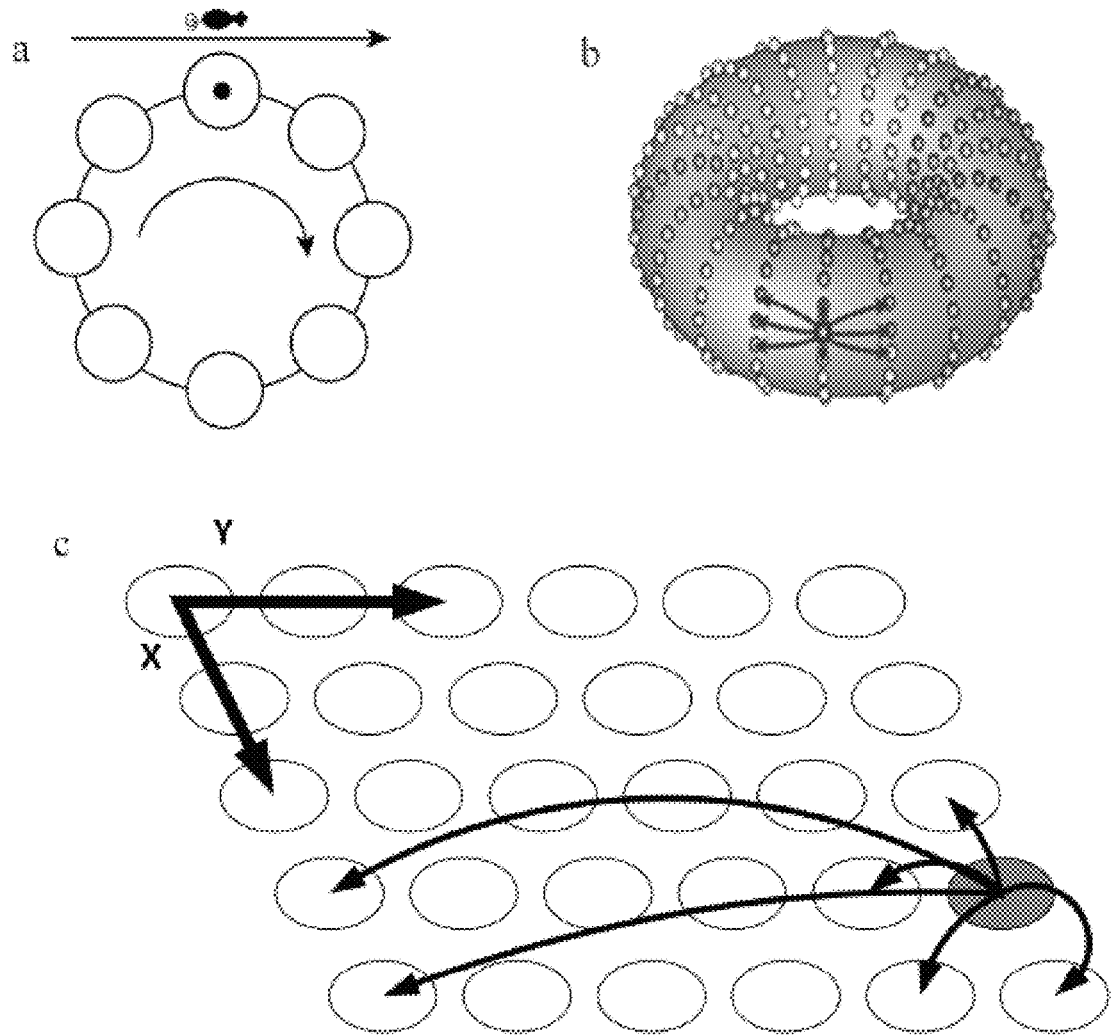
FIG. 5 is a schematic diagram of spatial cells attractor model; a is stripe cells single-dimensional cyclic attractor model, b is grid cells two-dimensional cyclic attractor model, c is place cells cyclic attractor plate.

Spatial cells network initialization. Set the number of head direction cell is 360, $\lambda_{net}$ represents uniformly distributed sampling with an interval of 1 from 12-52. $w_0$ represents adjustment vector a=1.1, k represents study rate is 0.0005, inhibited coefficient B=0.5. Set stripe head direction of stripe cells as $\theta_i = [0° \ 90° \ 180° \ 270°]$, to obtain hexagonal grid field, recursive weights connection of grid cells needs to be initialized, cells at the border of neural plate connects with cells at contrary border which is shown in FIG. 5, neural forms a cyclic surface, hexagonal grid field is formed by cyclic surface distortion. Based on the equation $w_{ij}^g = w_0$ ($\vec{x}_i - \vec{x}_j - s_{\theta\alpha}(t)$), position of neure "i" is $\vec{x}_i = (\vec{x}_{i_x}, x_{i_y})$, $x_{i_x} = (i_x - 0.5)/N$, $x_{i_y} = (i_y - 0.5)/N$, $i_x, i_x \in \{1 \ldots, N\}$. Distance between nerues on grid cells neural plate is called the induced metric, it is expressed as dist(.,.), it is an Euler paradigm in two-dimensional manifold, it can be expressed as:

$$\text{dist}(\vec{x}_i, \vec{x}_j) := \|\vec{x}_i - \vec{x}_j\|_{n_i = j = 1}^9 \min \|\vec{x}_i - \vec{x}_j + \text{offset}_j\| \quad (29)$$

$\text{offset}_j$ represents preset offset to realize cyclic distortion, it occurrence is: $\text{ofset}_1 := (0, 0)$; $\text{offset}_2 := (-1, 0)$; $\text{offset}_3 := (1, 0)$; $\text{offset}_4 := (0, 1)$; $\text{offset}_5 := (0, 1)$; $\text{offset}_6 := (i, 1)$; $\text{offset}_7 := (i, 1)$ $\text{offset}_8 := (i, -1)$; $\text{offset}_9 := (-1, -1)$; $\|\cdot\|$ represents Euler paradigm.

Weight initialization from grid cells to place cells is based on the number of neural plate of grid cells, set number M=80 in simulation experiment, weight initialization of each layer is 1/M.

Parameter setting of place cells and visual image matching are shown in table 1. Table 1 is preferences of the present disclosure.

Mode of execution below is used in all embodiments

Step 1, data collecting, make the robot move in the environment, collects image information of velocity, direction, and position. Collection period is 500 ms.

Step 2, path integral of spatial cells. Three kinds of spatial cells attractor models is shown in FIG. 5, at moment "t," velocity of robot in direction $\varphi(t)$ is $v(t)$, so that $v_\theta(t)$ and displacement $D_\theta(t)$ in direction $\theta$ is:

$$v_\theta(t)=\cos(\theta-\varphi(t))v(t)$$

$$D_\theta(t)=\int_0^t v_\theta(\tau)d\tau$$

Direction displacements are transformed into stripe cells to move in preferred direction $\theta$, $x_{\theta\alpha}$ is discharging rate of stripe cells, it means in $\theta$ direction, the phase of stripe is $\alpha$; discharging period of stripe cells is 1; stripe cells have the highest discharging rate at periodical position $nl+\alpha$ (n is integer) in preferred direction, its discharging rate can be expressed as:

$$x_{\theta\alpha}(t) = e^{\left(-\frac{(\omega_{\theta\alpha}(t)-\frac{1}{2})^2}{2\sigma_s^2}\right)}$$

Step 3, grid cells attractor proceeds periodical environment encoding driven by front-projection of stripe cells discharging rate.

Weight connection between grid cells forms grid cells attractor, $$w_{ij}^g = w_0(\vec{X}_i - \vec{X}_j - \omega_{\theta\alpha}(t))$$

Initial weight is set as:

$$w_0 = ae^{-\gamma|\vec{x}|^2} - e^{-\beta|\vec{x}|^2}$$

Grid cells discharging rate is determined by recursive connection and front-projection:

$$\tau\frac{ds_i}{dt} = f\left[\sum_j w_{ij}^g s_j + x_{\theta\alpha}(t)\right] - s_i$$

Step 4, grid cells generates place cells codes verse specific spatial position through competitive Heb study network.

A subset of grid cells series activity of generated place cells firing field is determined by using competitive Heb study.

$$\frac{dw_{ij}^{eh}}{dt} = kp_i(s_j - \langle s_j \rangle)$$

$s_j$ represents grid cell discharging rate, $\langle \cdot \rangle$ represents average discharging rate of grid cell, the right side of above equation determines change direction of weight: if current grid cell active rate is higher than average active rate which is input, synaptic connections is enhanced; otherwise, synaptic connections is inhibited. Through this kind of competitive study, grid cells series which exceeds average activation rate is determined as place cells discharging rate.

Place cells series activity is derived from projecting information of grid cells:

$$p_i(r)=A\cdot f[\Sigma_{j=1}^M w_{ij}^{eh} s_j(r)-C_{inh}]$$

A and $C_{inh}$ are gain constant and inhibitive constant of place cell network, M represents number of layers of grid cell neural plate, $w_{ij}^{eh}$ represents synaptic connection weight value from grid cell series "j" to place cell series "i", "r" represents current position of the animal; $C_{inh}$ is used to control the number of firing field of place cell, it is determined by $B^*\max(\vec{x}, p_i(r))$; it is ensured that there are few subsets of grid cell series is selected as single firing field of place cell through competitive algorithm mentioned above.

Step 5, discharging rate and discharging position determination in attractor surface of place cells.

measurement model at relative location of the actual external environment is built by place cell attractor model; two-dimensional continuous attractor model is on a neural plate through partial excitatory, partial inhibitive connection and overall inhibitive connection to form a random activity bump. This attractor is driven by the spatial cell path integral system; it is reset by image information of current position. Activity bump is shown as a grey neuron in FIG. 5; it is similar to cyclic grid cells attractor model. Place cells at the border of network connect with place cells at another border to become cyclic.

Excitatory weight value connection matrix $\varepsilon_{m,n}$ of place cell is built by a two-dimensional Gaussian distribution, "m, n" represents the distance between abscissas of belonging units in coordinates X and Y; the distribution of weight value can be expressed as:

$$\varepsilon_{m,n}=e^{-(m^2+n^2)/k_p}$$

$k_p$ represents width constant of position distribution;

A variable quantity of place cell activity resulted from partial excitatory connection can be expressed as:

$$\Delta p_{EX,EY} = \Sigma_{i=0}^{(n_X-1)} \Sigma_{j=0}^{(n_Y-1)} p_{i,j} \varepsilon_{m,n}$$

$n_X$, $n_Y$ represents the scale of two dimensional matrix of place cell in (X,Y) space, it represents the activity range of attractor on neural plate; since place cell is borderless in network which is shown in FIG. 5c, place cell which located at the border of neural plate will connect with place cell at the border of another neural plate to generate excitatory connection; the precondition of place cell iteration and visual template matching is: finding relative position of place cell attractor in neural plate, coordinate of this relative position can be expressed by the subscript of weight value matrix:

$$m=(X-i)(\mod n_X) \quad (13a)$$

$$n=(Y-j)(\mod n_Y) \quad (13b)$$

Each place cell also receives an overall inhibitive signal from the whole network; it is different from the grid cell sombrero attractor model; an inhibitive signal of place cell occurs after partial excitatory connection instead of working at the same time; symmetry between excitatory and inhibitive connection matrix guarantees suitable neural network kinetics. It ensures attractor in space cannot be excited without limitation. A variable quantity of place cell activity resulted from inhibiting connection can be expressed as:

$$\Delta p_{X,Y} = \Sigma_{i=0}^{n_X} \Sigma_{j+0}^{n_Y} p_{i,j} \psi_{m,n} - \varphi$$

$\psi_{m,n}$ represents weight value of inhibitive connection, level of overall inhibition is controlled by φ;

To ensure all place cell activity is no less than zero at the moment of "t+1", compare place cell activation rate with 0:

$$p_{X,Y}^{t+1} = \max\{p_{X,Y}^t + \Delta p_{EX,EY} + \Delta p_{IX,IY}, 0\}$$

Then, proceed normalization for place cell activation rate:

$$p_{X,Y}^{t+1} = \frac{p_{X,Y}^t}{\sum_{i=0}^{n_X} \sum_{j=0}^{n_Y} p_{i,j}^t}$$

Step 6, place cells path integral

Figure 6:
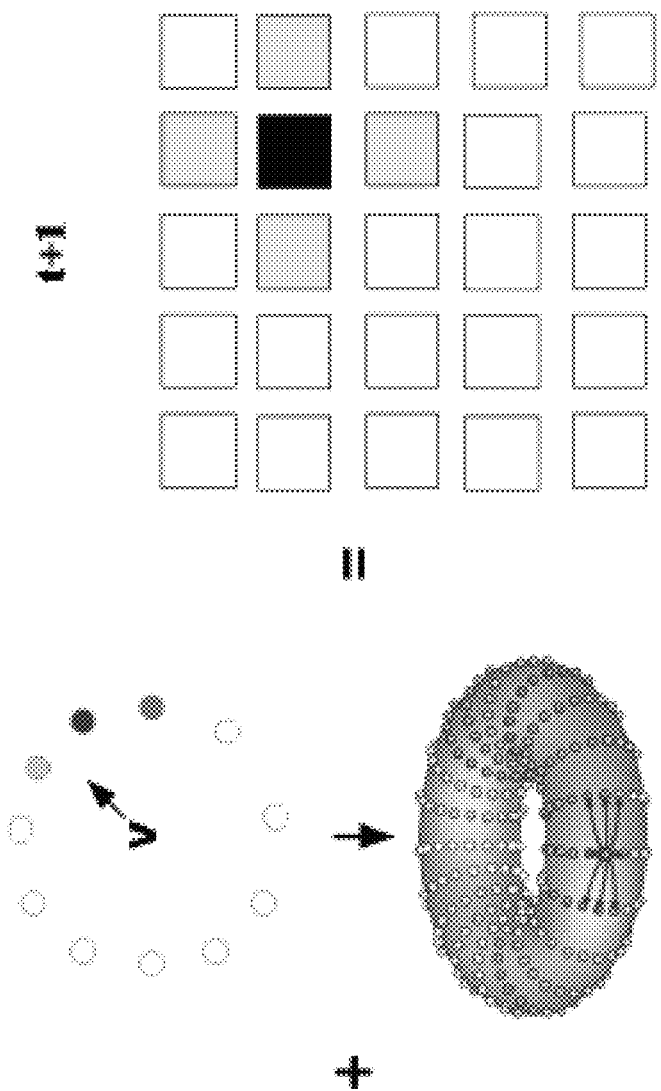
FIG. 6 is a schematic diagram of place cells path integral. Black point is the central position of place cells attractor, the path integral of place cells attractor proceeds with the moving of grid cells.

Place update of place cells is driven by upstream cortex spatial cells path integral, discharging rate of path integral attractor at the previous moment is determined by offset and current discharging rate of place cells attractor, this process is shown in FIG. 6. So that discharging rate of place cells at next moment can be expressed as:

$$p_{X,Y}^{t+1} = \sum_{m=\delta X_0}^{\delta X_0+1} \sum_{n\delta Y_0}^{\delta Y_0+1} \alpha_{mn} p_{(m+X)(n+Y)}^t$$

$\delta X_0$, $\delta Y_0$ is rounded-down shift in X-Y the coordinate system, this shift value is determined by velocity and direction information:

$$\begin{bmatrix} \delta X_0 \\ \delta Y_0 \end{bmatrix} = \begin{bmatrix} \lfloor k_m \vec{e}_{\theta_i} v \cdot \cos\theta \rfloor \\ \lfloor k_n \vec{e}_{\theta_i} v \cdot \sin\theta \rfloor \end{bmatrix}$$

[·] represents rounded-down, $k_m$, $k_{ni}$ are path integral constant, $\vec{e}_{\theta_i}$ is unit vector headed to $\theta_i$, θ represents current head direction, place cell activation rate in next moment is obtained by current place cell activation rate times residual value $\alpha_{mn}$, residual value is obtained by quantization of place cell activity package diffusion, this diffusion can be expressed by residual shift, it is derived from path integral of grid cell, path integral of grid cell is derived from forward driving of stripe cell. So that residual shift is:

$$\begin{bmatrix} \delta X_f \\ \delta Y_f \end{bmatrix} = \begin{bmatrix} k_m \vec{e}_{\theta_i} v \cdot \cos\theta - \delta X_0 \\ k_n \vec{e}_{\theta_i} v \cdot \sin\theta - \delta Y_0 \end{bmatrix} \quad (19)$$

Residual value is the piecewise function of residual shift:

$$\alpha_{mn} = g(\delta X_f, m - \delta X_0) g(\delta Y_f, n - \delta Y_0)$$

$$g(p, q) = \begin{cases} 1 - p, & q = 0 \\ p, & q = 1 \end{cases}$$

Step 7, matching and construction of visual template of the current point.

Figure 7:
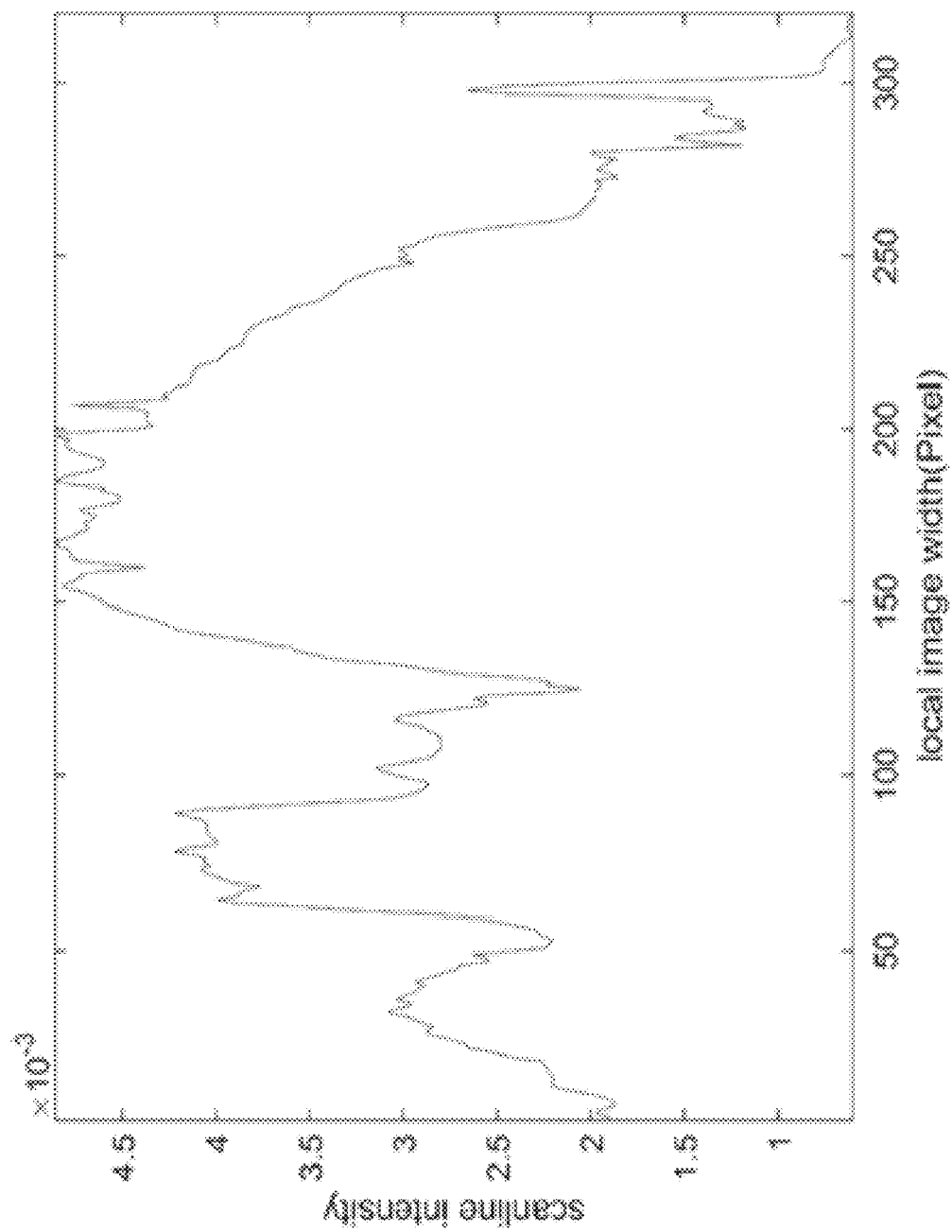
FIG. 7 is a schematic diagram of visual template and scan line intensity distribution; a is color map collected by Kinect, b is corresponding depth map, c is scan line intensity distribution corresponding to a color map.

Robot collects color and depth map in current point through Kinect, calculating image scan line intensity distribution of current point, first, transfer the color image into the gray image, then, sum all intensity in each line of gray level image and normalization. A scan line intensity distribution image is shown in FIG. 7, 7a is a color map, 7b is depth map.

Image scan line intensity distribution which is collected by a robot in the whole process is stored as a partial visual template, compare scan line intensity distribution of a current image with a partial visual template which is previously stored to ensure whether the robot reaches visited position.

Using average intensity absolute difference function to compare figure distribution and visual template; average intensity absolute difference between two scan line intensity distributions also called intensity shift, it is expressed as g(c):

$$g(c, I^j, I^k) = \frac{1}{b - |c|} \left( \sum_{i=1}^{b-|c|} |I_{i+\max(c,0)}^j - I_{i-\min(c,0)}^j| \right) \quad (3-5)$$

$I^j$, $I^k$ is scan line intensity distribution of figures which are compared, c is profile shift, b represents width of map.

Since map matching is highly influenced by illumination, lower the illumination influence to improve matching accuracy at different environment, color map and depth map matching are used simultaneously to ensure absolute position, since illumination intensity is different at different time in actual environment, different weight value is set to shift difference between color map and depth map, map fitness metric G can be obtained:

$$G = \mu_R |g_{iR}(c) - g(c)| + \mu_D |g_{iD}(c) - g(c)|$$

$\mu_R$ and $\mu_D$ are weight value of color map and depth map, $\mu_R + \mu_D = 1$, in continuous map, the minimum shift value of $I^j$ and $I^k$ is $c_m$, it equals to the minimum G value of two maps;

$$c_m = \min_{c \in [\rho - b, b - \rho]}(G)$$

Shift ρ ensures there is an overlapping between two maps. Set map compare threshold is $c_t$, when $c_m < c_t$, image is not matching, current map is a new map, it is stored in visual template set $\{V^i\}$, when $c_m \geq c_t$, it is considered as a repeating scene.

Step 8, construction of cognitive map

Topological relationships between place cell discharging activities are established by cognitive map built in the present disclosure; it includes topological experimental point "e." Topological relation between experimental points is expressed as $t_{ij}$. Each experimental point includes: place cell discharging activity $p^i$ of current position, visual template $V^i$; position of single experimental point is expressed as $p^i$; so that single experimental point is defined as:

$$e_i = \{p^i, V^i, d^i\}$$

Set empirical threshold is $S_{th}$, a position metric D is obtained by comparing current position and position in experimental point:

$$D = |p^i - p|$$

When position metric of the current experimental point is higher than an empirical threshold or new visual template is found, a new experimental point is built. Environment experimental point is built gradually during robot exploring the environment.

Transfer quantity $t_{ij}$ stores position change quantity which is calculated by path integral:

$$t_{ij} = \{\Delta d^{ij}\}$$

$t_{ij}$ forms a new connection relationship between current experimental point and former experimental point, $e_j = \{p^j, V^j, d^i + \Delta d^{ij}\}$, experimental point will not change during empirical iteration, it will only change when closed-loop is deceted.

Step 9, updating of empirical map in closed-loop position

When the actual closed-loop point is detected by the visual template, the robot returns to the same position, however, new experimental point generated by the accumulation of location variable in a closed-loop position not matches with this same position, to match them, all experimental point in the closed-loop position should be updated:

$$\Delta d^i = \theta[\sum_{j=1}^{N_f}(d^j - d^i - \Delta d^{ij}) + \sum_{k=1}^{N_t}(d^k - d^i - \Delta d^{ki})] \quad (28)$$

θ is a correcting rate constant, $N_f$ represents the transfer number from experimental point $e_i$ to another experimental point, $N_t$ represents the transfer number from another experimental point to experimental point $e_i$; in actual experiment, set θ=0.5, higher value will lead to unstable of the whole map, update process of the whole map is continuously, but it is the most significant in closed-loop position.

Embodiment 1

Figure 10:
FIG. 10 is a 2 m*2 m experimental environment in embodiment 1. Redline is real motion track of robot.

The robot moves in the shape of Arabic numerals "8" for 399 s in a 2 m*2 m experimental environment which is shown in FIG. 10.

Figure 11:
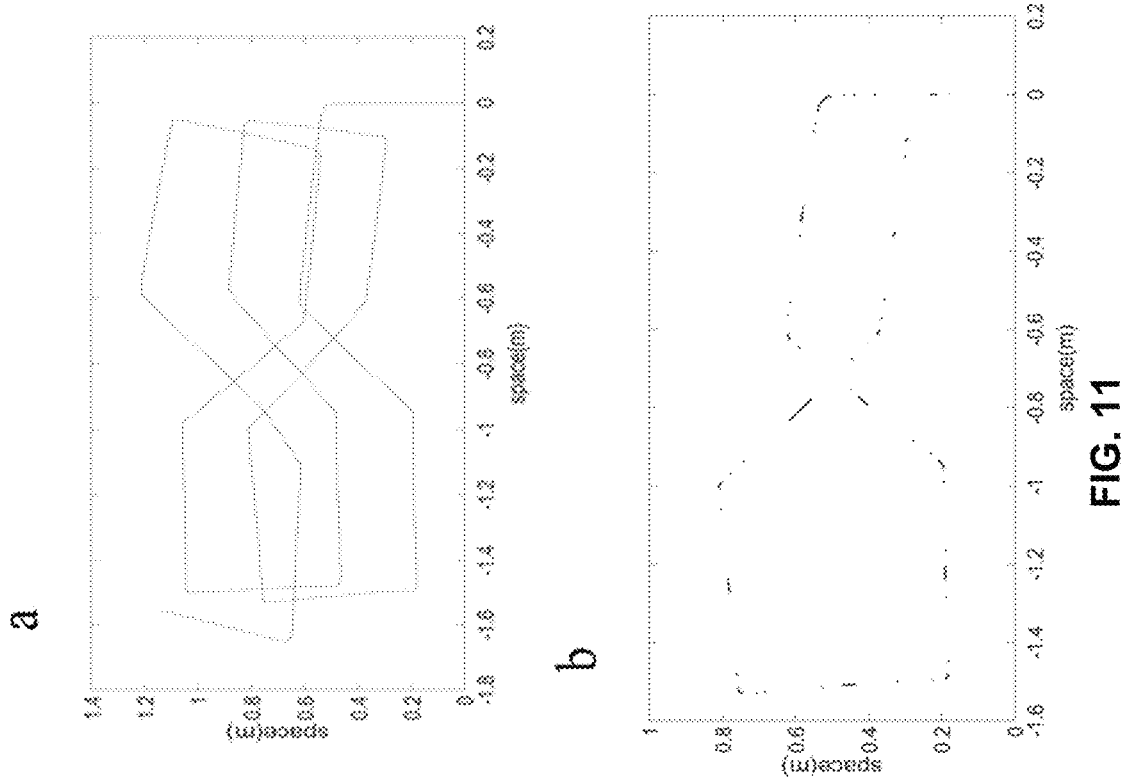
FIG. 11 is path integral map and place cells expression map at last in embodiment 1, red point in 10b is discharging rate point of place cells.
Figure 12:
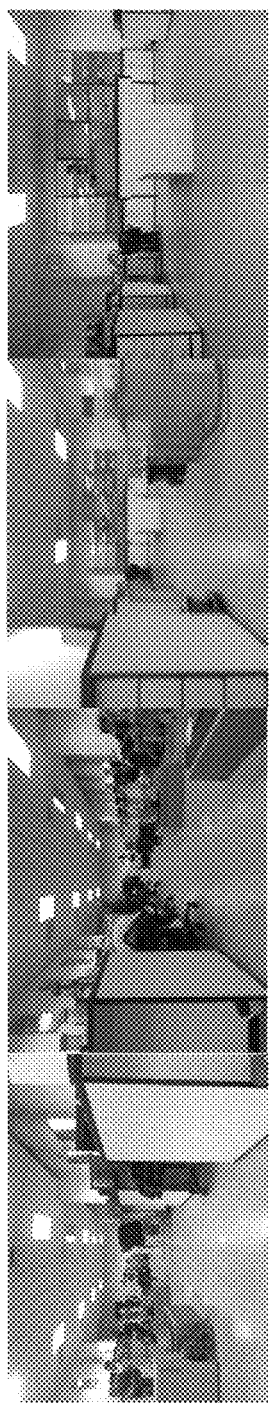
FIG. 12 color diagrams collected in a 3 m*10 m experimental environment crowded by many similar color diagrams in embodiment 2.

Final generated path integral map and place cells discharging rate expressing map is shown in FIG. 11. It is obviously that path integral map cannot express the passing environment correctly. However, place cells discharging rate map can express the passing environment perfectly.

Embodiment 2

Figure 13:
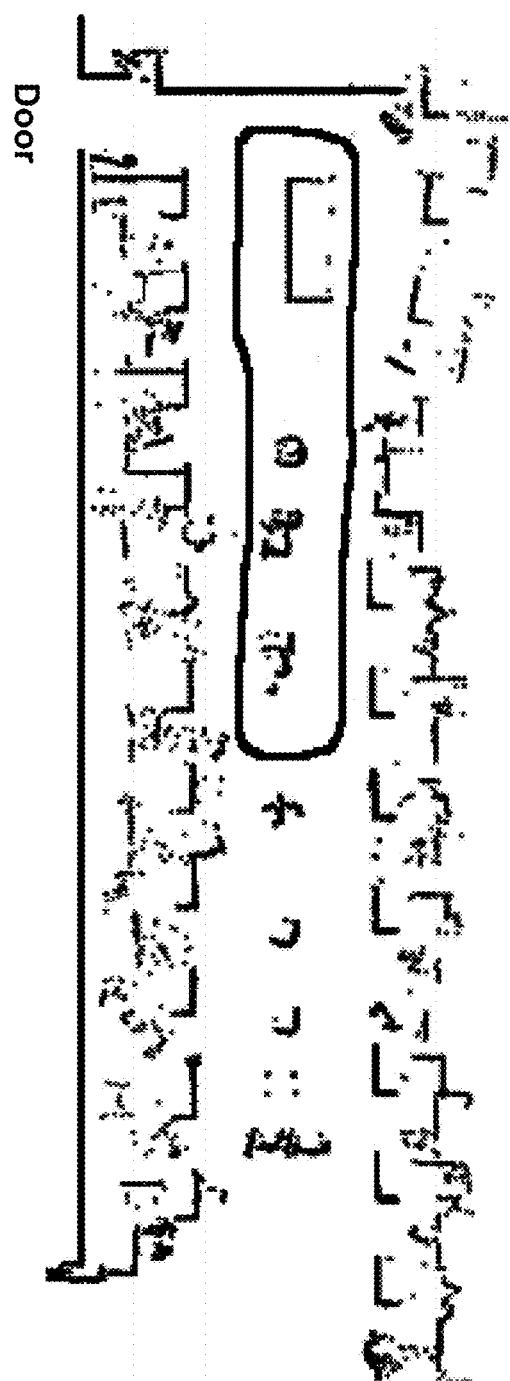
FIG. 13 is scanning top-view of the locus in a 3 m*10 m experimental environment in embodiment 2; blue line is the real track of robot.

3 m*10 m experimental environment crowded by many similar color diagrams, the robot moves around the environment until finish exploring from 16 s to 170 s. The experimental environment of embodiment 2 is shown in FIG. 13. Effective diagram of a cognitive map built by this model is shown in line 2, row 3 of FIG. 13.

Figure 14:
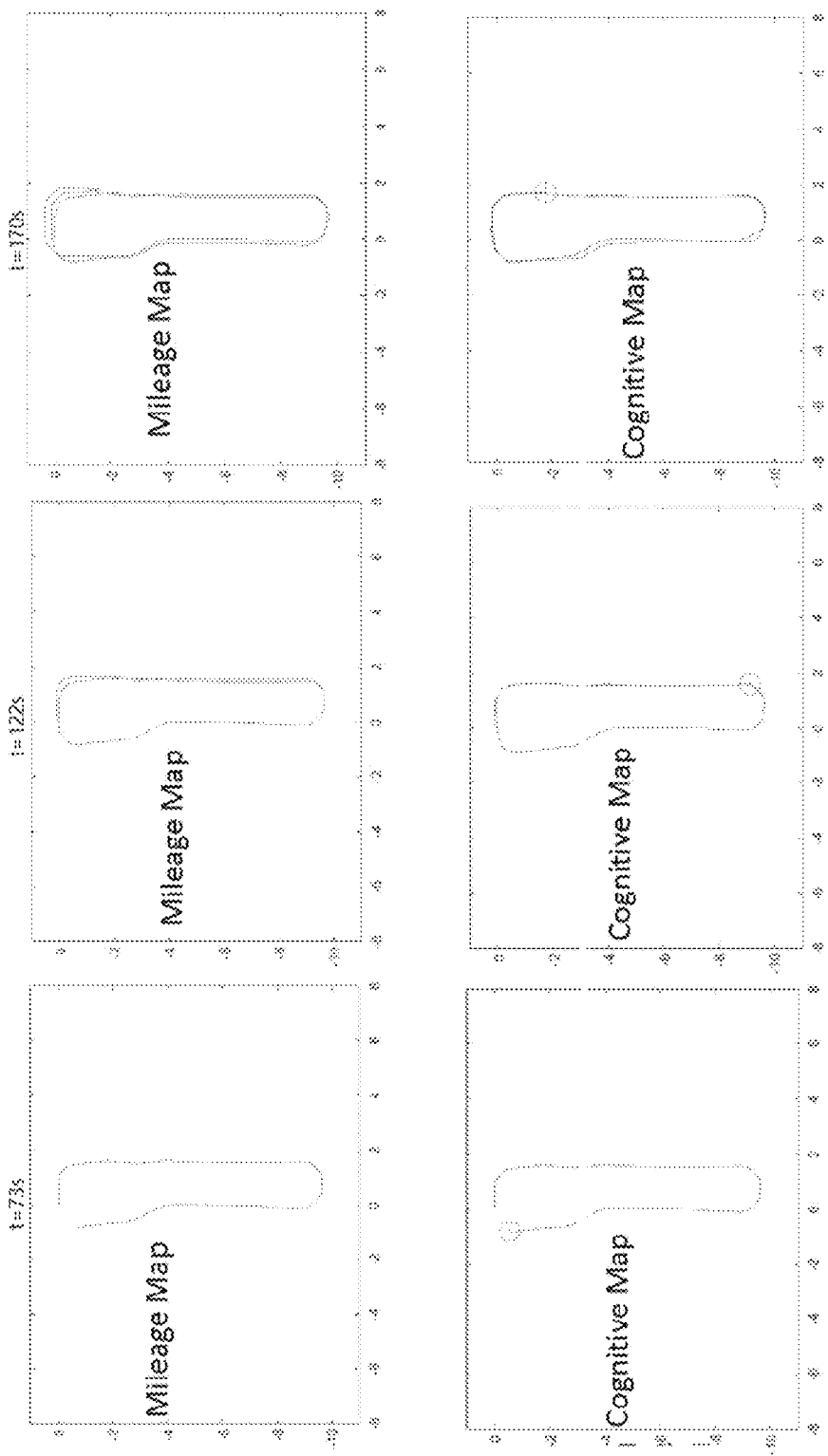
FIG. 14 is map construction process in the present disclosure.

It can be seen, at last, a precisely cognitive map for the whole environment is built on the model. However, original mileage nomograph has a large deviation with the environment. The construction process of the map is shown in FIG. 14. The first line is mileage nomograph map collected by a robot; the second line is construction process of cognitive map based on the present disclosure. As is seen in the figure, when there is no closed-loop point is detected, there is no difference between mileage nomograph map and cognitive map, at 89 s, environment close-loop point is detected, cognitive map adjusts itself at 89.5 s, as time goes on, deviations of mileage nomograph map becomes larger and larger. Since there is closed-loop detection during the construction process of cognitive map, it is closer to actual motion track.

Figure 15:
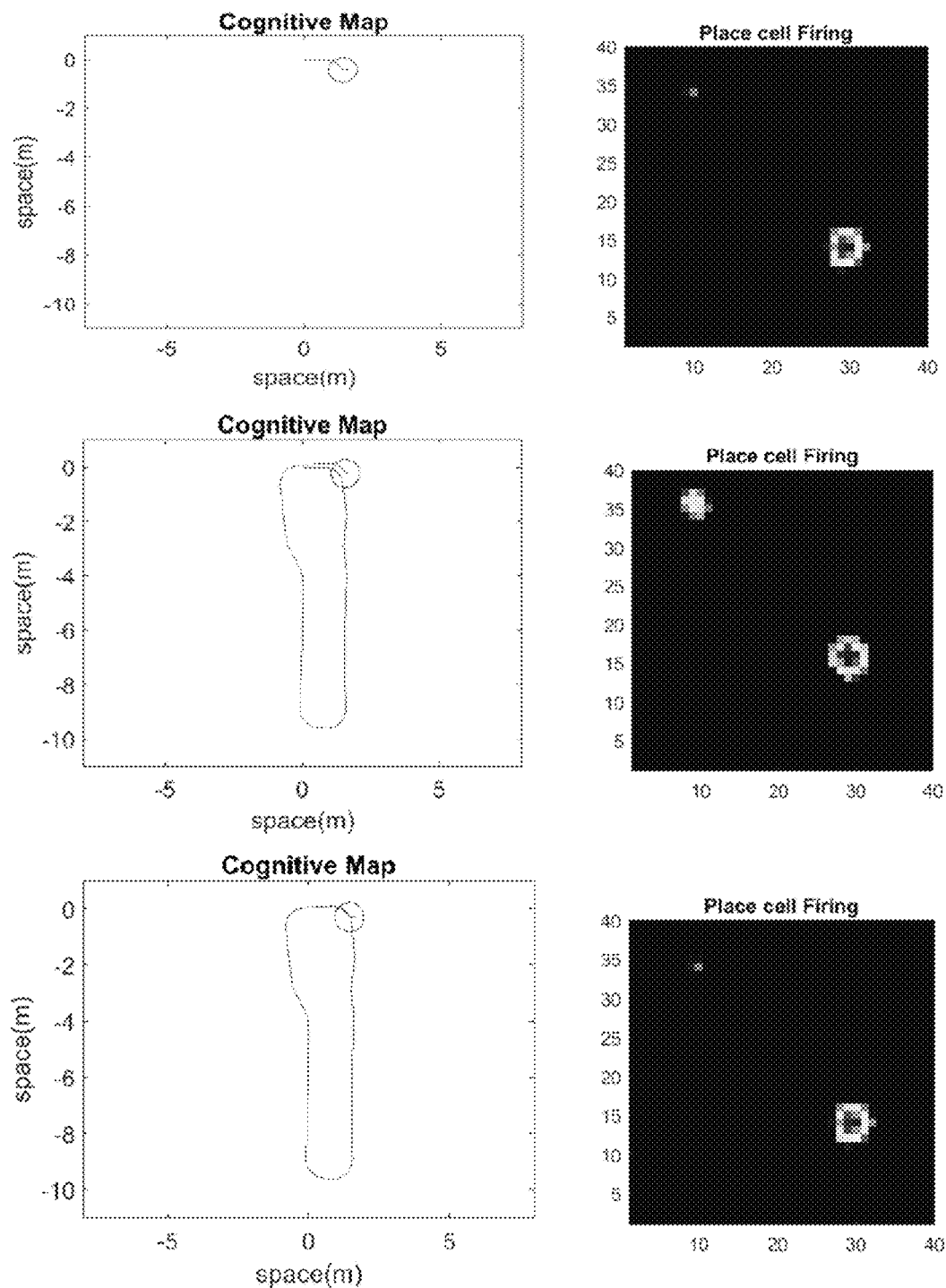
FIG. 15 is reset process of closed-loop detection and spatial cells discharging.

Process of closed-loop detection and reset of spatial cells discharging is shown in FIG. 15, the first line is cognitive map and place cells discharging rate at 7.5 s, at 89 s, environment close-loop point is detected (in line 2), the model adjusts itself at 89.5 s (in line 3) and proceed reset of discharging rate. It is remarkable that place cells series activity in FIG. 15 is not exactly the same with cognitive map point (cyclic in the first row), it because lace cells series activity express the relative position of the robot in the environment. The present disclosure is effective in the easily-confused environment.

Embodiment 3

Figure 16:
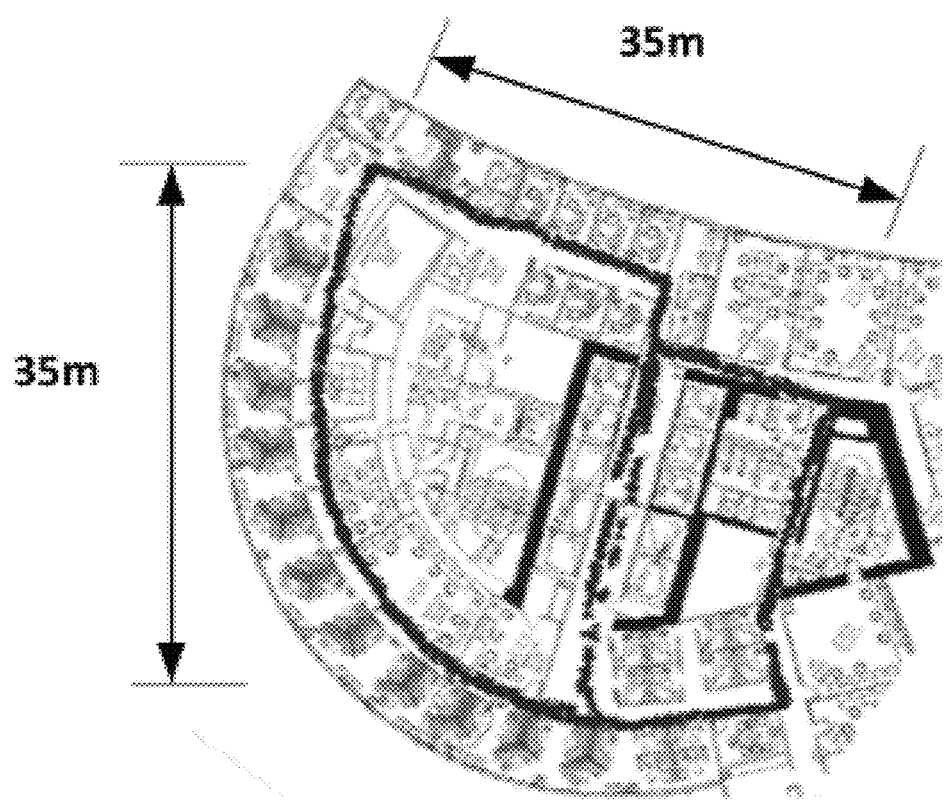
FIG. 16 is scanning top-view of the cyclic building which radius is 35 m; blue line is the real track of robot.

Exploring a cyclic building (radius=35 m) with the method mentioned in the present disclosure to prove it is reliable in cognitive map building in the huge and complex environment, the front view of the cyclic building is shown in FIG. 16.

Figure 9:
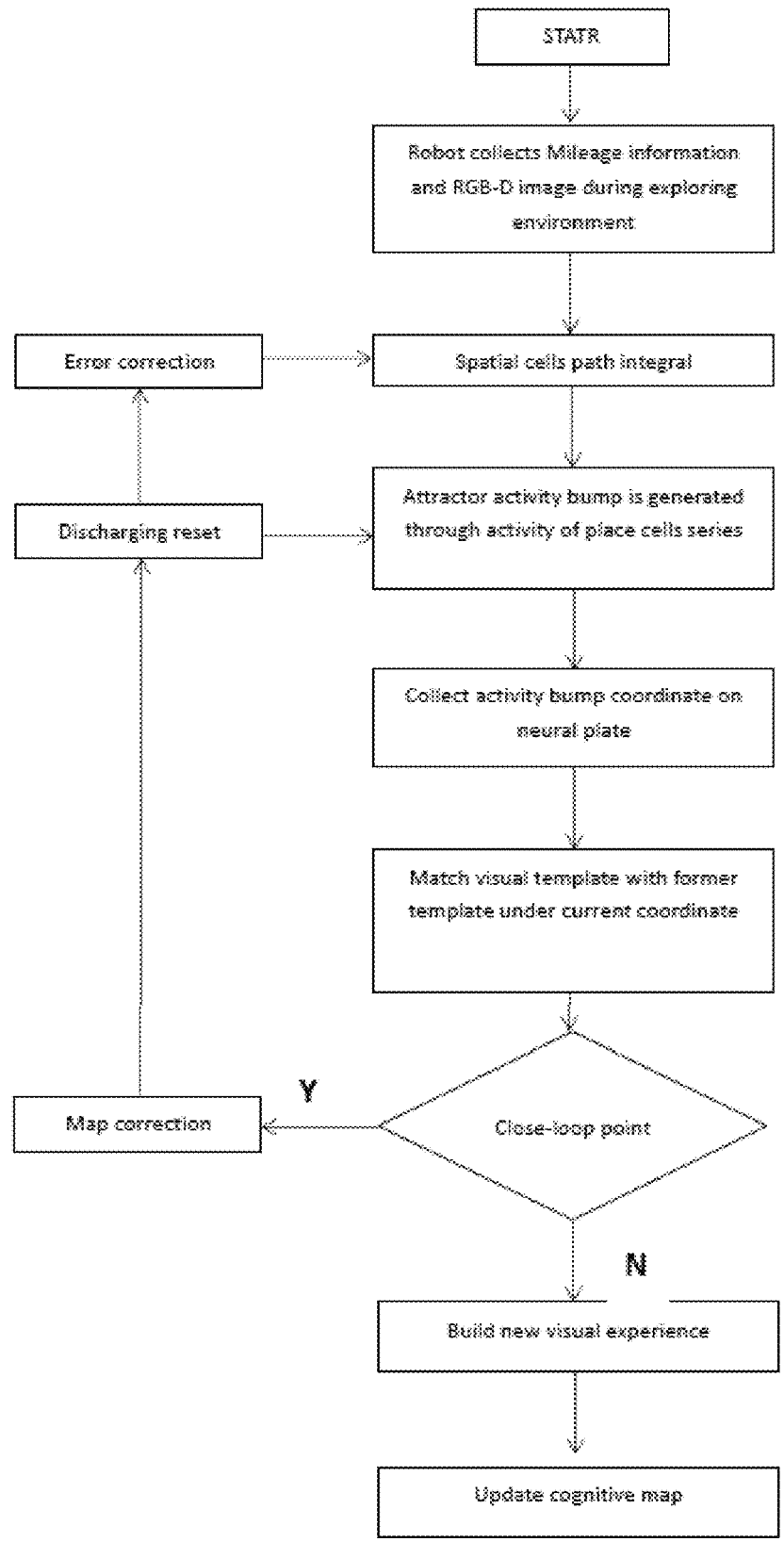
FIG. 9 is algorithm flow chart of the present disclosure.
Figure 17:
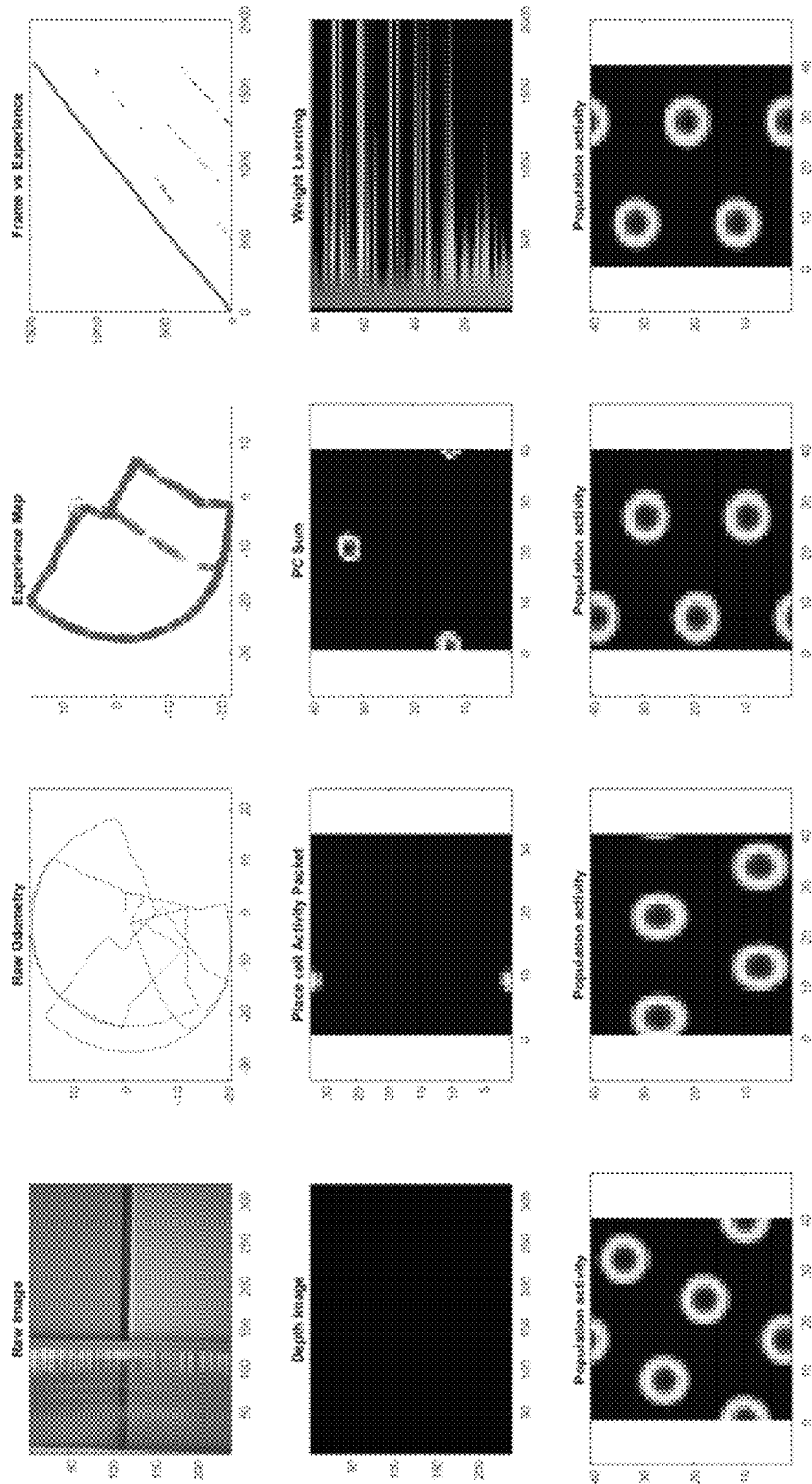
FIG. 17 is a cognitive map and elemental maps formed by robot at 1050 s in the present disclosure.

Robot in FIG. 8 and method in FIG. 9 is used to explore cyclic building with 1050 s. Exploring track is the blue line shown in FIG. 16. As is shown in FIG. 17, after comparing path integral map and final cognitive map, path integral map cannot describe current environment map precisely, but cognitive map describes current environment map precisely.

Figure 18:
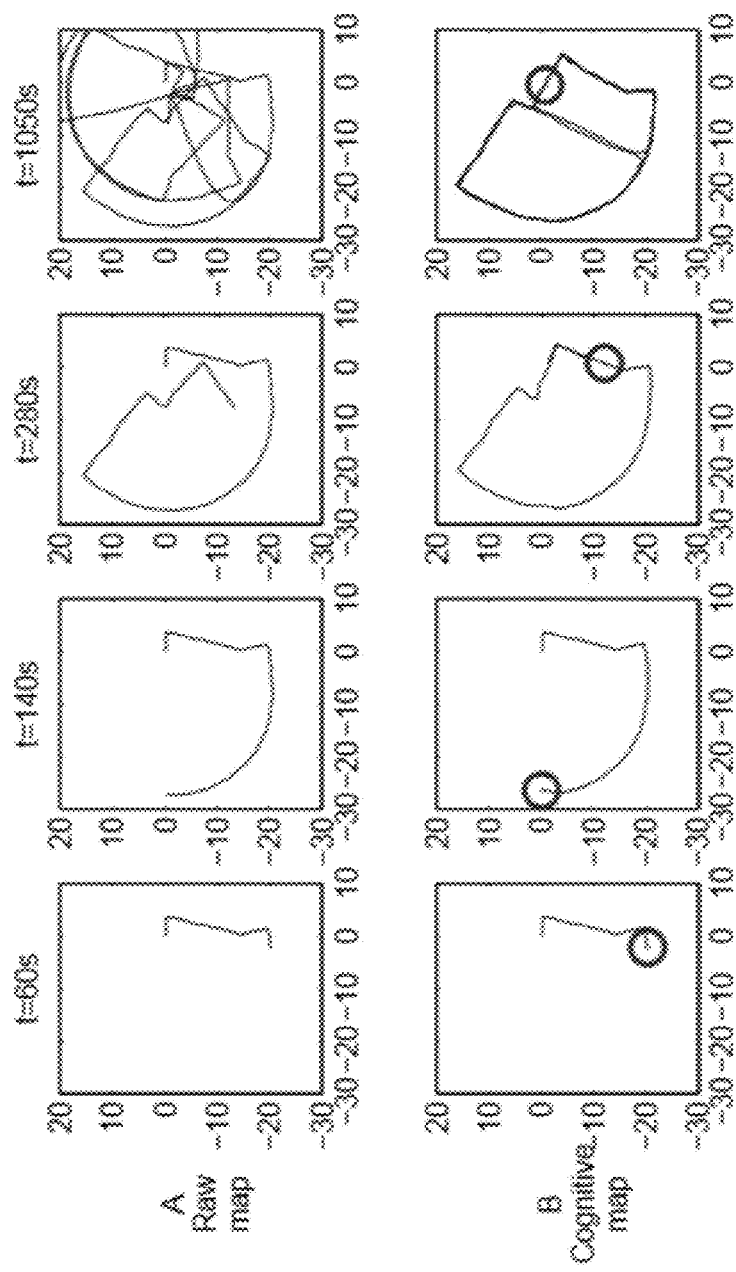
FIG. 18 is comparison diagram between path integral map and cognitive map.

FIG. 18 describes evolutionary process of path integral map and cognitive map. The evolutionary process of the cognitive map with the time goes on, 18A is origin mileage map, 18B is cognitive map disclosed by the present disclosure. As we can see, before going through the first closed-loop, the cognitive map is same with origin map, however at t=280 s, origin map which is generated by path integral using origin mileage appears position ambiguity, it cannot cognize that the robot has been already back to the close-loop point. After correcting errors by using visual images, the actual cognitive map will describe current position precisely. It shows that reset of close-loop by using the RGB-D image is effective. Only when the close-loop point is detected, cognitive map in actual position will correct and update for origin map. In the end, a precise cognitive map for the actual indoor environment (shown in FIG. 16) is built on the model disclosed in the present disclosure; this map has been encoded metric and topology information of spatial position.

Embodiment 1, 2 and 3 have been proved that the present disclosure has good universality and validity. Embodiments herein can precisely generate cognitive maps for different environments.

What is claimed is:

1. A robot for constructing navigation maps using a mouse hippocampal place cell model, the robot comprising:
   a photoelectric encoder configured to collect velocity signals;
   a gyroscope configured to collect angle signals;
   an RGB-D sensor configured to collects color and depth images; and
   a CPU configured to perform acts to construct the navigation maps, the acts comprising:
      step (1) setting a head direction of the robot as 0 when the robot is static, collecting a transient velocity and angle information through the photoelectric encoder and the gyroscope, wherein images with the velocity of 2 frames per second are collected using a motion sensing input device,
      step (2) based on a linear velocity integral of stripe cells associated with the mouse hippocampal place cell model, collecting a motion linear velocity of the robot and angle information through the photoelectric encoder and the gyroscope, wherein at moment of "t", the velocity in φ direction φ(t) is v(t) so that the velocity and displacement in $v_θ(t)$ and $D_θ(t)$ in θ direction meet equation (1) and (2), respectively:

$$v_θ(t) = \cos(θ - φ(t))v(t) \quad (1)$$

$$D_θ(t) = \int_0^t v_θ(\tau)d\tau \quad (2), \text{ and}$$

direction displacements are transformed into the stripe cells to move in preferred direction θ, $x_{θα}$ is discharging rate of the stripe cells in θ direction, the phase of the stripe cells is α; a discharging period of the stripe cells is 1, the stripe cells have the highest discharging rate at a periodical position nl+α in the preferred direction such that a distance of periodical discharge resetting of the stripe cells represents $\omega_{\theta\alpha}(t)$, which is space phase difference between $D_\theta$ and $\alpha$ and is calculated using equation (3):

$$\omega_{\theta\alpha}(t)=(d_\theta(t)-\alpha)\bmod 1 \qquad (3)$$

wherein a discharging rate of the stripe cells is calculated using equation (4):

$$x_{\theta\alpha}(t) = e^{\left(-\frac{\left(\omega_{\theta\alpha}(t)-\frac{l}{2}\right)^2}{2\sigma_s^2}\right)} \qquad (4)$$

wherein a standard deviation is expressed as $\sigma_s$, which indicates a width of the stripe cells in the preferred direction, and the stripe cells across periodical positions and multiple positions are excited at the same time, displacement in a space specific direction is encoded as prior input information of grid cells to drive attractor of the grid cells to move on a flat surface, step (3) performing periodical position encoding of a grid cell attractor model under a two-dimensional continuous space, wherein there are recursion connections among the grid cells, interactions between weight values creates grid cell attractors in space-specific positions, the grid cell attractors are distributed in a hexagon, prior inputs from the stripe cells drive the grid cell attractors to move on a flat surface to perform the periodical specific encoding for the flat surface, which is a neural plate associated with the mouse hippocampal place cell model, a grid cell discharging rate is calculated using equation (5):

$$\tau\frac{ds_i}{dt} = f\left[\sum_j w_{ij}^g s_j + B_i\right] - s_i, \qquad (5)$$

wherein $\tau$ represents corresponding time constant of a neural of the mouse hippocampal place cell model, a neural transferring function $f[\bullet]$ is a simple nonlinear rectification function and meet conditions:

$x>0$, $f(x)=x$, $x\leq 0$, $f(x)=0$, wherein the neural discharging rate of neuron i in current position is $s_i$, $w_{ij}^g$ represents a connection weight value from neuron j to neuron j in the neural plate, $\sum_j w_{ij}^g s_j$ represents an inhibitive recursive input, which is projected on neuron i, $B_i$ represents a prior excited input from the stripe cells; neuron i of the gird cells has a preferred direction $\theta_i$, which is determined by projection of the stripe cells;

wherein the grid cells receive a prior projection from the stripe cells, the preferred direction information in a prior projection is used to calculate the direction changing of an output weight value and velocity input information received by the robot using equation (6):

$$B_i=\omega_{\theta\alpha}(t) \qquad (6),$$

wherein weight values of the recursion connections among the grid cells is calculated using equations (7) and (8):

$$w_{ij}^g=w_0(\vec{x_i}-\vec{x_j}-\omega_{\theta\alpha}(t)) \qquad (7), \text{ and}$$

$$w_0=ae^{-\gamma|\vec{x}|^2}-e^{-\beta|\vec{x}|^2} \qquad (8),$$

wherein a weight matrix of the weight values is distributed in a manner such that high values are in a middle of the weight matrix and low values are on both sides of the weight matrix, a middle position of the weight matrix is $\vec{x}-s_{\theta\alpha}(t)$, $\gamma=1.05\times\beta$, $\beta=3/\lambda_{net}^2$, $\lambda_{net}$ is a period of grids, which are formed in the neural plate, when a is 1, all connections are inhibitory such that local inhibitive connections are enough to generate responses of the grid cells, step (4): generating codes in certain spatial positions through a neural network from the grid cells to place cells, wherein the grid cells are an input source of the place cells, discharging of the place cells is an output of a path integral system, a distribution of the weight values from grid cell series to a position synapsis is learned to generate an unimodal firing field of place cell series to calculate an active proportion of the grid cells with overlapping activity package in each position, wherein a subset of activities of the grid cell series are identified using a competitive HEB based algorithm and activities of the place cell series are calculated using equation (9):

$$\frac{dw_{ij}^{eh}}{dt} = kp_i(s_j - \langle sj\rangle) \qquad (9)$$

wherein k represents a study rate, $p_i$ is a discharging rate of the place cells, $s_j$ represents the grid cell discharging rate, $\langle \bullet \rangle$ represents an average discharging rate of the grid cells, a change direction of weight is determined in a manner such that: if a current grid cell active rate is higher than an average active rate that is input, synaptic connections are enhanced; if a current grid cell active rate is not higher than an average active rate that is input, synaptic connections are inhibited, wherein $w_{ij}^{eh}\geq 0$ is satisfied such that weight values are not negative values and weight values calculated by equation (9) is inhibited, wherein a place cell space selectivity to a given place is derived from selective binding of activities of the grid cells with spatial phases and spatial spaces such that the grid cells with the spatial spaces and directions as well as the stripe cells with spatial spaces and directions are required, wherein each neural plate represents a grid cell series activity, grid cell series with different sizes are generated through average collecting a and $\lambda_{net}$;

equation (9) detects the grid cell series activity form spatial overlapping of multi-layer neural plates, wherein the place cell series activity is derived from projecting information of the grid cells based on equation (10);

$$p_i(r)=A\cdot f[\Sigma_{j=1}^M w_{ij}^{eh} s_j(r)-C_{inh}] \qquad (10)$$

wherein A and $C_{inh}$ are a gain constant and an inhibitive constant of the place cells, M represents number of layers of the neural plate of the grid cells, $w_{ij}^{eh}$ represents a synaptic connection weight value from grid cell series "j" to place cell series "i", "r" represents a current position of a moving animal; $C_{inh}$ is used to control a number of the firing field of the place cells, which is determined by $B*\max(p_i(r))$ such that there are subsets of the grid cell series selected as a single firing field of the place cells through the competitive algorithm, step (5): updating path integrals of the place cells, wherein a measurement model at relative location of actual external environment is built by the place cell attractor model, a two-dimensional continuous attractor model is on a neural plate through a partial excitatory, a partial inhibitive connection and an overall inhibitive connection form a random activity bump, and the attractor is driven by a spatial cell path integral system;

step (5-1) obtaining the relative location of current points, wherein an excitatory weight value connection matrix $\varepsilon_{m,n}$ of the place cells is built by a two-dimensional Gaussian distribution, "m, n" represents the distance between abscissas of belonging units in coordinates X and Y, a distribution of the weight values is calculated using equation (11):

$$\varepsilon_{m,n} = e^{-(m^2+n^2)/k_p} \tag{11},$$

wherein $k_p$ represents width constant of position distribution, wherein a variable quantity of the activities of then place cells resulted from a partial excitatory connection is calculated using equation (12):

$$\Delta p_{EX,EY} = \Sigma_{i=0}^{(nX-1)} \Sigma_{j=0}^{(nY-1)} p_{i,j} \varepsilon_{m,n} \tag{12}$$

wherein $n_X$, $n_Y$ represents the scale of a two dimensional matrix of the place cells in (X,Y) space, which represents an activity range of the attractor on the neural plate, the place cells are borderless in the neural network, place cells located at the border of the neural plate connect with place cells at the border of another neural plate to generate excitatory connections, a place cell iteration and visual template matching are determined using relative positions of the place cell attractor in the neural plates, coordinate of this relative position is represented by a subscript of a weight value matrix (13a and 13b):

$$m = (X-i)(\mod n_X) \tag{13a},$$

$$n = (Y-j)(\mod n_Y) \tag{13b},$$

wherein each place cell receives overall inhibitive signals from the whole neural network, which is different from the grid cell sombrero attractor model, inhibitive signals of the place cells occur after partial excitatory connection instead of working at the same time, symmetry between excitatory and inhibitive connection matrix guarantees suitable neural network kinetics such that attractor in space is not excited without limitation, a variable quantity of place cell activity resulted from an inhibiting connection is calculated using equation (14):

$$\Delta p_{IX,IY} = \Sigma_{i=0}^{nX} \Sigma_{j=0}^{nY} p_{i,j} \psi_{m,n} - \varphi \tag{14}$$

wherein $\psi_{m,n}$ represents weight value of inhibitive connection, a level of overall inhibition is controlled by $\varphi$, a place cell activation rate is compared with 0 such that all place cell activities are no less than zero at the moment of "t+1" using equation (15):

$$p_{X,Y}^{t+1} = \max\{p_{X,Y}^t + \Delta p_{EX,EY} + \Delta p_{IX,IY}, 0\} \tag{15}$$

Wherein normalization is performed for the place cell activation rate using equation (16):

$$p_{X,Y}^{t+1} = \frac{p_{X,Y}^t}{\sum_{i=0}^{n_X} \sum_{j=0}^{n_Y} p_{i,j}^t}, \tag{16}$$

step (5-2) calculating the path integral of the place cells such that movement of the place cell attractor is derived from the path integral of spatial cells over self-motion cues, displacement in specific direction which drives the grid cell attractor to move is encoded by the stripe cells, the grid cell attractor encodes two-dimensional space in a specific direction to excite different grid cell series, and movement of the place cell attractor is determined by the subset of different grid cell series activity;

wherein the place cell discharging rate $p_{X,Y}^{t+1}$ after the path integral is calculating using equation (17):

$$p_{X,Y}^{t+1} = \Sigma_{m=\delta X_0}^{\delta X_0 + 1} \Sigma_{n=\delta Y_0}^{\delta Y_0 + 1} \alpha_{mn} p_{(m+X)(n+Y)}^t \tag{17}$$

Wherein $\delta X_0$, $\delta Y_0$ is rounded-down shift in X-Y coordinate system, this shift value is determined by velocity and direction information using equation (18):

$$\begin{bmatrix} \delta X_0 \\ \delta Y_0 \end{bmatrix} = \begin{bmatrix} \lfloor k_m \vec{e}_{\theta_i} v \cdot \cos\theta \rfloor \\ \lfloor k_n \vec{e}_{\theta_i} v \cdot \sin\theta \rfloor \end{bmatrix} \tag{18}$$

wherein [•] represents rounded-down, $k_m$, $k_n$ are path integral constant, $\vec{e}_{\theta_i}$ is unit vector headed to $\theta_i$, $\theta$ represents current head direction, the place cell activation rate in next moment is obtained by the current place cell activation rate times a residual value $\alpha_{mn}$, the residual value is obtained by quantization of place cell activity package diffusion associated with a residual shift derived from the path integral of the grid cells, the path integral of the grid cells is derived from forward driving of the stripe cells such that the residual shift is satisfied with equation (19):

$$\begin{bmatrix} \delta X_f \\ \delta Y_f \end{bmatrix} = \begin{bmatrix} k_m \vec{e}_{\theta_i} v \cdot \cos\theta - \delta X_0 \\ k_n \vec{e}_{\theta_i} v \cdot \sin\theta - \delta Y_0 \end{bmatrix} \tag{19}$$

wherein the residual value is the piecewise function of the residual shift as indicated by equation (20):

$$\alpha_{mn} = g(\delta X_f, m - \delta X_0) g(\delta Y_f, n - \delta Y_0) \tag{20}$$

$$g(p, q) = \begin{cases} 1 - p, & q = 0 \\ p, & q = 1 \end{cases} \tag{21}$$

step (5-3) matching of view templates such that the motion sensing input device collects RGB maps and depth maps and proceeds to a closed-loop detection when a closed-loop is detected, wherein the RGB-D maps as visual cues are used to correct errors of the path integral and reset the navigation cell series activities, when an illumination changes, the RGB maps are influenced, and the depth maps are influenced by the illumination, the closed-loop detection and new environment cognitive are finished by comparing the depth maps and the RGB maps, wherein a visual template matching algorithm is used to scan a line intensity distribution of color and the depth maps, a scan line intensity distribution is a one-dimensional vector, which is normalization of a sum of each line of a grey-scale map, the scan line intensity distribution of a figure that is collected by the robot during detection process is stored as a partial visual template, a compare scan line intensity distribution of a current figure with a partial visual template which is stored before such that: if matching succeeds, a closed-loop is considered to be found; a new visual template is considered to be stored if matching fails, wherein an average intensity absolute difference function is used to compare the figure distribution and the visual template, an average intensity absolute difference between two scan line intensity distributions is the intensity shift, which is g(c) and calculated using equation (22):

$$g(c, I^j, I^k) = \frac{1}{b-|c|}\left(\sum_{i=1}^{b-|c|}|I^j_{i+max(c,0)} - I^j_{i-min(c,0)}|\right), \quad (22)$$

wherein $I^j$, $I^k$ are scan line intensity distributions of figures, which are compared, c is profile shift, b represents widths of the figures, wherein the color map and depth map matching are used simultaneously to ensure an absolute position, the different weight value is set to shift difference between color map and depth map; map fitness metric G is obtained using equation (23):

$$G=\mu_R|g_{iR}(c)-g(c)|+\mu_D|\mu g_{iD}(c)-g(c)| \quad (23),$$

wherein $\mu_R$ and $\mu_D$ are weight values of the color map and the depth map, $\mu_R+\mu_D=1$, in continuous maps, the minimum shift value of $I^j$ and $I^k$ is $c_m$, which equals to the minimum G value of two maps based on equation (24);

$$c_m=\min_{c\in[\rho-b,b-\rho]}(G) \quad (24),$$

wherein shift ρ such that there is an overlapping between two maps, a map comparing threshold is $c_t$, when $c_m<c_t$, the current map is a new map and is stored in visual template set $\{V^i\}$, when $c_m \geq c_t$, the current map is considered as a repeating scene;

step (6) constructing and correcting a cognitive map, wherein topological relationship between place cell discharging activities is established by the cognitive map, which includes topological experimental point "e," the topological relationship between experimental points is expressed as $t_{ij}$, each experimental point includes: place cell discharging activity $p^i$ of the current position, visual template $V^i$; a position of single experimental point is expressed as $p^i$ such that a single experimental point is defined using equation (25):

$$e_i=\{p^i,V^i,d^i\} \quad (25),$$

step (6-1) iterating empirical topology by setting an empirical threshold as $S_{th}$, wherein a position metric D is obtained by comparing the current position and a position in the experimental point using equation (26):

$$D=|p^i-p| \quad (26),$$

when a position metric of the current experimental point is higher than an empirical threshold or a new visual template is found, a new experimental point is built;

wherein transfer quantity $t_{ij}$ stores position change quantity, which is calculated by the path integral using equation (27):

$$t_{ij}=\{\Delta d^{ij}\} \quad (27),$$

wherein $t_{ij}$ forms a new connection relationship between the current experimental point and the former experimental point based on equation $e_j=\{p^j,V^j,d^i+\Delta d^{ij}\}$, the experimental point does not change when closed-loop is deleted, step (6-2) updating the empirical map in a closed-loop position, when the actual closed-loop point is detected by the visual template, the robot returns to the same position, in response to a determination that new experimental point generated by the accumulation of location variable in the closed-loop position does not match with this same position, all experimental points in the closed-loop position are updated using equation (28):

$$\Delta d^i=\theta[\Sigma_{j=1}^{N_f}(d^j-d^i-\Delta d^{ij})+\Sigma_{k=1}^{N_t}(d^k-d^i-\Delta d^{ki})] \quad (28),$$

wherein θ is a correcting rate constant, $N_f$ represents the transfer number from experimental point $e_i$ to another experimental point, $N_t$ represents the transfer number from another experimental point to experimental point $e_i$;

step (6-3) resetting spatial cell discharging such that a discharging rate of the spatial cells is reset to previous active states of the spatial cells when the closed-loop point is detected by the robot through the visual template matching.

* * * * *